(12) United States Patent
Kandylas et al.

(10) Patent No.: US 10,572,524 B2
(45) Date of Patent: Feb. 25, 2020

(54) CONTENT CATEGORIZATION

(71) Applicant: MICROSOFT TECHNOLOGY LICENSING, LLC, Redmond, WA (US)

(72) Inventors: Vasileios Kandylas, Redmond, WA (US); Serge-Eric Tremblay, Redmond, WA (US); Omar Alonso, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 439 days.

(21) Appl. No.: 15/055,772

(22) Filed: Feb. 29, 2016

(65) Prior Publication Data
US 2017/0249384 A1 Aug. 31, 2017

(51) Int. Cl.
*G06F 16/00* (2019.01)
*G06F 16/34* (2019.01)
*G06F 16/33* (2019.01)
*G06F 16/35* (2019.01)

(52) U.S. Cl.
CPC .......... *G06F 16/345* (2019.01); *G06F 16/334* (2019.01); *G06F 16/358* (2019.01)

(58) Field of Classification Search
CPC ......... G06F 17/30719; G06F 17/30713; G06F 17/30705; G06F 16/345; G06F 16/35; G06F 17/241; G06F 16/334; G06Q 50/01
See application file for complete search history.

(56) References Cited

U.S. PATENT DOCUMENTS 5,708,825 A * 1/1998 Sotomayor ......... G06F 17/2235
707/E17.013
7,930,302 B2 4/2011 Bandaru et al.
(Continued)

FOREIGN PATENT DOCUMENTS

CN 104484343 A 4/2015
WO 2015161129 A1 10/2015

OTHER PUBLICATIONS

Titov, et al., "A Joint Model of Text and Aspect Ratings for Sentiment Summarization", In Proceedings of Association for Computational Linguistics, vol. 8, Jun. 2008, pp. 308-316.
(Continued)

*Primary Examiner* — Leslie Wong
(74) *Attorney, Agent, or Firm* — Shook, Hardy & Bacon L.L.P.

(57) ABSTRACT

Aspects of the technology described herein generate a comment-summary interface that can help a user find comments of interest to the user. The comment-summary interface allows a user to access comments according to topics instead of scrolling through all of the comments found in a comment section associated with a primary content, such as a news article on a website, a social post, product review, and such. Categorizing the comments into topics makes more efficient use of computer resources by avoiding the need to display comments that are not of interest to the user. The plurality of comments analyzed by aspects of the technology described herein are unstructured comments. Unstructured comments lack specific subject matter categories designated by a user or preselected by a webpage.

20 Claims, 13 Drawing Sheets

(56) References Cited

U.S. PATENT DOCUMENTS

| | | | | |
|---|---|---|---|---|
| 8,577,884 | B2* | 11/2013 | Poteet | G06Q 30/02 707/737 |
| 9,449,080 | B1* | 9/2016 | Zhang | G06F 17/30657 |
| 9,552,399 | B1* | 1/2017 | Browning | G06F 17/30554 |
| 9,672,555 | B1* | 6/2017 | Dillard | G06Q 30/0631 |
| 2004/0117725 | A1* | 6/2004 | Chen | G06F 17/2775 715/254 |
| 2007/0174343 | A1* | 7/2007 | Fortuna | G06F 17/218 |
| 2008/0244438 | A1* | 10/2008 | Peters | G06F 17/30867 715/772 |
| 2008/0249764 | A1* | 10/2008 | Huang | G06F 17/2785 704/9 |
| 2009/0112892 | A1* | 4/2009 | Cardie | G06F 17/30719 |
| 2009/0319342 | A1* | 12/2009 | Shilman | G06F 17/30864 705/7.41 |
| 2010/0274787 | A1* | 10/2010 | Lu | G06Q 30/02 707/737 |
| 2010/0306192 | A1* | 12/2010 | Kapur | G06F 17/30867 707/723 |
| 2011/0137906 | A1* | 6/2011 | Cai | G06F 17/2785 707/740 |
| 2012/0179751 | A1* | 7/2012 | Ahn | G06Q 30/0282 709/204 |
| 2013/0091117 | A1* | 4/2013 | Minh | G06F 17/30864 707/709 |
| 2014/0067370 | A1* | 3/2014 | Brun | G06F 17/271 704/9 |
| 2015/0286627 | A1* | 10/2015 | Chang | G06F 17/2705 704/9 |
| 2016/0044380 | A1* | 2/2016 | Barrett | H04N 21/4826 725/53 |
| 2016/0162456 | A1* | 6/2016 | Munro | G06F 17/241 704/9 |
| 2016/0314200 | A1* | 10/2016 | Markman | G06F 17/30705 |
| 2017/0083817 | A1* | 3/2017 | Di Sciullo | G06N 5/025 |

OTHER PUBLICATIONS

Louis, et al., "Summarization of Business-related Tweets: A Concept-based Approach", In Proceedings of the 24th International Conference on Computational Linguistics, Dec. 8, 2012, 10 pages.

Kim, et al., "Comprehensive Review of Opinion Summarization", In Technical report, Jul. 9, 2015, pp. 1-30.

Hu, et al., "Mining and Summarizing Customer Reviews", In Proceedings of the tenth ACM SIGKDD international conference on Knowledge discovery and data mining, Aug. 22, 2004, 10 pages.

Goldensohn, et al., "Building a Sentiment Summarizer for Local Service Reviews", In Proceedings of NLP in the Information Explosion Era, Apr. 22, 2008, 10 pages.

Chang, et al., "Aspect Summarization from Blogsphere for Social Study", In Proceedings of Seventh IEEE International Conference on Data Mining Workshops, Oct. 28, 2007, pp. 9-14.

Tadano, et al., "Multi-aspects Review Summarization Based on Identification of Important Opinions and their Similarity", In Proceedings of the 24th Pacific Asia Conference on Language, Information and Computation, Nov. 4, 2010, pp. 685-692.

Sharifi, et al., "Summarizing Microblogs Automatically", In Proceedings of Human Language Technologies: The Annual Conference of the North American Chapter of the Association for Computational Linguistics, Jun. 2, 2010, pp. 385-688.

Chakrabarti, et al., "Event Summarization Using Tweets", In Proceedings of the Fifth International AAAI Conference on Weblogs and Social Media, Jul. 17, 2011, pp. 66-73.

Hu, et al., "Mining Opinion Features in Customer Reviews", In Proceedings of the 19th National Conference on Artitical Intelligence, Jul. 25, 2004, pp. 755-760.

"Second Written Opinion Issued in PCT Application No. PCT/US2017/019223", dated Aug. 23, 2017, 7 Pages.

"International Search Report and Written Opinion Issued in PCT Application No. PCT/US17/019223", dated Mar. 31, 2017, 13 Pages.

O'Connor, et al., "TweetMotif: Exploratory Search and Topic Summarization for Twitter", In Proceedings of the Fourth International AAAI Conference on Weblogs and Social Media, Dec. 31, 2010, 2 Pages.

* cited by examiner

CONTENT CATEGORIZATION

BACKGROUND

Various websites can elicit thousands of user comments about a business, product, news article, or other content. It can be very difficult to categorize the user comments or otherwise extract useful information from the user comments. Some websites attempt to address this problem by requesting structured input along with a comment or instead of a comment. For example, websites that host reviews can ask the reviewers to rate the business on a scale, such as one to five stars. The average of the ratings represents the people's opinions about the venue. Some websites ask the reviewers to rate individual aspects (such as the food, the service, etc.) of a business. The individual aspects, however, need to be predefined according to the type of venue or product reviewed (e.g., noise for hotels, food quality/taste for restaurants, and ease of use for electronic devices). Accordingly, use of structured data to develop a summary of user sentiment is limited by the structure. Unstructured comments, such as those typically posted in association with a news article, remain difficult to categorize.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein generate a comment-summary interface that can help a user find comments of interest to the user. The comment-summary interface can provide a summary of a large collection of short text comments. The comment-summary interface allows a user to access comments according to topics instead of scrolling through all of the comments found in a comment section associated with a primary content, such as a news article on a website, a social post, product review, and such. Articles on popular websites can have thousands of comments posted to a single story. Categorizing the comments into topics makes more efficient use of computer resources by avoiding the need to display comments that are not of interest to the user.

The plurality of comments analyzed by aspects of the technology described herein are unstructured comments. Unstructured comments lack specific subject matter categories designated by a user or preselected by a webpage. The unstructured comments include text submitted by a person and may include information about the person, such as a user ID or other details. Comments typically posted to a news article are unstructured. Generally, the user is not asked to categorize his comment and is free to write on any topic of interest.

BRIEF DESCRIPTION OF THE DRAWINGS

Aspects of the technology described in the present application are described in detail below with reference to the attached drawing figures, wherein.

DETAILED DESCRIPTION

Figure 1:
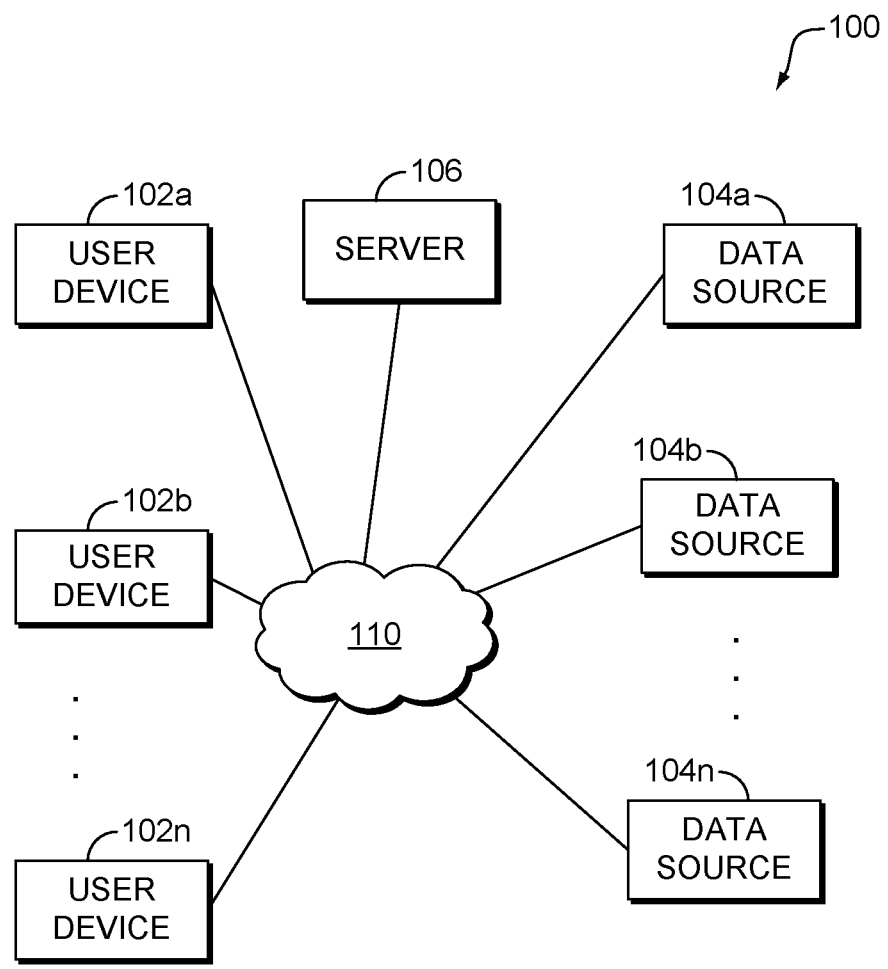
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein generate a comment-summary interface that can help a user find comments of interest to the user. The comment-summary interface allows a user to access comments according to topics instead of scrolling through all of the comments found in a comment section associated with a primary content, such as a news article on a website, a social post, product review, and such. Articles on popular websites can have thousands of comments posted to a single story. Categorizing the comments into topics makes more efficient use of computer resources by avoiding the need to display comments that are not of interest to the user.

The plurality of comments analyzed by aspects of the technology described herein are unstructured comments. Unstructured comments lack specific subject matter categories designated by a user or preselected by a webpage. The unstructured comments include text submitted by a person and may include information about the person, such as a user ID or other details. Comments typically posted to a news article are unstructured. The user is not asked to categorize his comment and is free to write on any topic of interest.

The comment-summary interface can include various topics derived from a textual analysis of the plurality of comments. For example, topics derived from a plurality of comments associated with a sports article could include the names of specific players, a particular team, particular coach, a particular play, or other topics found in the comments.

The comment-summary interface can also include a sentiment for an individual topic. The sentiment is derived by performing a sentiment analysis on comments categorized into the particular topic. For example, comments about a quarterback, where the quarterback is a topic, could be 73% positive. This could mean that 73% of the comments associated with the topic quarterback express a positive sentiment.

The comment-summary interface can be generated as part of a search results page. In this aspect, one or more search results could be for an article that is associated with comments. The search results page could include a comment-summary interface presented in a sidebar or as part of the search result that lists one or more topics found in the comments. In one aspect, a triggering mechanism is used to determine whether a comment-summary interface should be shown when a search result links to a news article having comments. The trigger could be based on whether the topics of the comments are also responsive to the query. In another aspect, the comment-summary interface is generated by a webpage that hosts the comments. In another aspect, the comment-summary interface is generated by a personal assistant upon the user navigating to a website or news article that has comments.

In another aspect, the search results page includes a comment-summary interface summarizing topics found in the search results. In other words, the query can be the primary content and the search results are the comments or the search results can be augmented by the comments. For example, the query could be news articles for the President and the comment-summary could summarize topics found in the news articles that were responsive to the query and/or comments associated with the news articles.

As used herein, a comment is a textual content that is in a direct or indirect relationship with a primary content. A direct relationship is present when the primary content and the comment are associated by a user. For example, a reply to a first comment on a news article associates the first comment and the reply through a direct relationship.

An indirect relationship is based on a common feature of comments. For example, all comments by a single author could be indirectly related. All comments in a specific user's social network could be indirectly related. All social posts with the same hashtag could be indirectly related. All reviews of a restaurant, product, or place can be indirectly linked to each other. For example, all reviews of a movie could be linked indirectly to each other.

Aspects of the technology described herein will be primarily described in the context of an article and linked comments, but that is only one possible implementation.

Having briefly described an overview of aspects of the technology described herein, an exemplary operating environment suitable for use in implementing the technology is described below.

Exemplary Operating Environment

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources, such as data sources 104*a* and 104*b* through 104*n*; server 106; and network 110. It should be understood that environment 100 shown in FIG. 1 is an example of one suitable operating environment. Each of the components shown in FIG. 1 may be implemented via any type of computing device, such as computing device 1300 described in connection to FIG. 13, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102*a* and 102*b* through 102*n* can be client devices on the client-side of operating environment 100, while server 106 can be on the server-side of operating environment 100. The user devices can access webpages and post unstructured comments to a media server. In one aspect, the browser application on the user devices accesses a search engine webpage hosted by the server 106.

Server 106 can comprise server-side software designed to work in conjunction with client-side software on user devices 102*a* and 102*b* through 102*n* so as to implement any combination of the features and functionalities discussed in the present disclosure. For example, the server 106 may receive and categorize unstructured comments and provide a comment categorization to a user. This division of operating environment 100 is provided to illustrate one example of a suitable environment, and there is no requirement for each implementation that any combination of server 106 and user devices 102*a* and 102*b* through 102*n* remain as separate entities. Several more detailed operating environments are provided in FIGS. 3, 5, 7, and 9.

User devices 102*a* and 102*b* through 102*n* may comprise any type of computing device capable of use by a user. For example, in one aspect, user devices 102*a* through 102*n* may be the type of computing device described in relation to FIG. 13 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make comment data, social posts, or other unstructured comments available to any of the various constituents of operating environment 100, or comment classifier 200 described in connection to FIG. 2. (For example, in one aspect, one or more data sources 104a through 104n provide (or make available for accessing) comment-input component 205 of FIG. 2.) Data sources 104a and 104b through 104n may be discrete from user devices 102a and 102b through 102n and server 106 or may be incorporated and/or integrated into at least one of those components. The data sources 104a though 104n can comprise a comment log, social post feed, and such.

Figure 2:
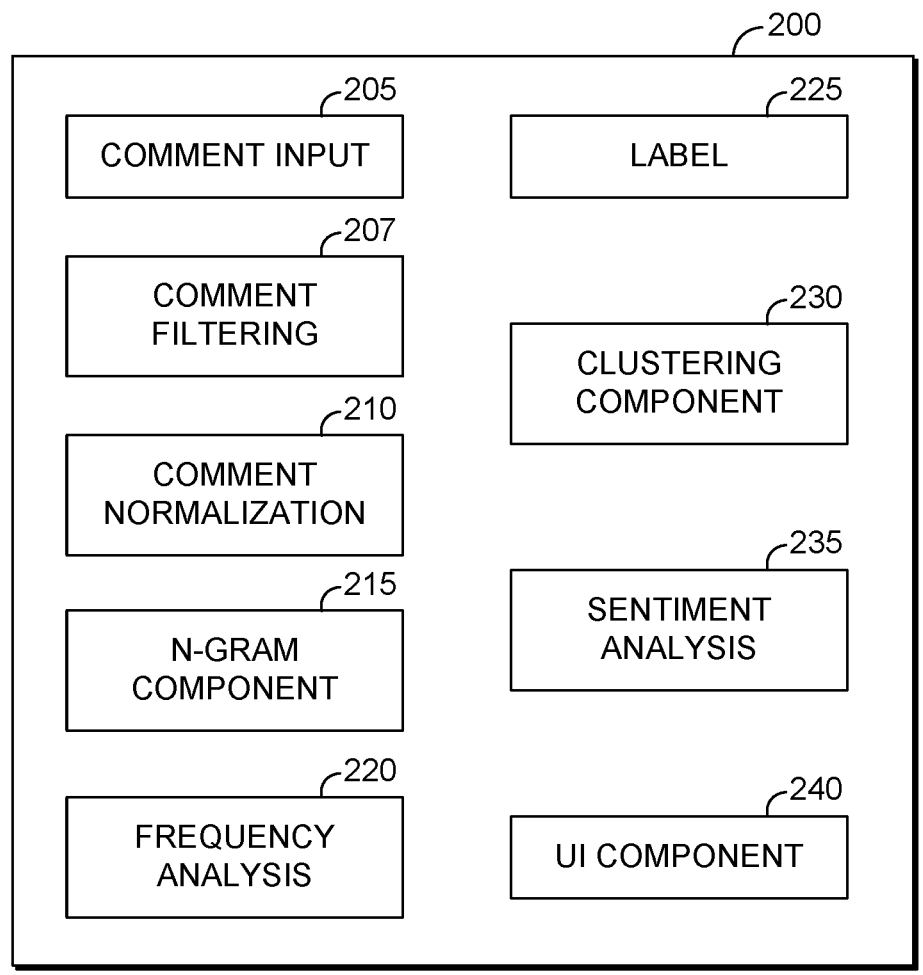
FIG. 2 is a diagram depicting an exemplary computing environment for categorizing content, in accordance with an aspect of the technology described herein.

Operating environment 100 can be utilized to implement one or more of the components of comment classifier 200, described in FIG. 2, including components for collecting user data, collecting comments, normalizing comments, detecting sentiment and assigning comments to a subject matter category. More detailed operating environments are provided in FIGS. 3, 5, 7, and 9.

Referring now to FIG. 2, with FIG. 1, a block diagram is provided showing aspects of an example computing system architecture suitable for implementing an aspect of the technology described herein and designated generally as comment classifier 200. Comment classifier 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example comment classifier 200 includes network 110, which is described in connection to FIG. 1, and which communicatively couples components of comment classifier 200 including comment-input component 205, comment-filtering component 207, comment-normalization component 210, N-Gram component 215, frequency-analysis component 220, label component 225, clustering component 230, sentiment-analysis component 235, and user-interface component 240. Comment classifier 200 may be embodied as a set of compiled computer instructions or functions, program modules, computer software services, or an arrangement of processes carried out on one or more computer systems, such as computing device 1300 described in connection to FIG. 13, for example.

In one aspect, the functions performed by components of comment classifier 200 are associated with one or more applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of comment classifier 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example comment classifier 200, it is contemplated that in some aspects functionality of these components can be shared or distributed across other components.

Comment-input component 205 receives comments for analysis. The comments can be received from a data source, such as a media server. The comment-input component 205 can include a crawler function that retrieves comments from webpages. The comments can be associated with a primary content, such as a news article or social post. The comments can be stored locally for analysis.

As used herein, a comment is a textual content that is in a direct or indirect relationship with a primary content. A direct relationship is present when the primary content and the comment are associated by a user. For example, a reply to a first comment on a news article associates the first comment and the reply through a direct relationship.

An indirect relationship is based on a common feature of comments. For example, all comments by a single author could be indirectly related. All comments in a specific user's social network could be indirectly related. All social posts with the same hashtag could be indirectly related. All reviews of a restaurant, product, or place can be indirectly linked to each other. For example, all reviews of a movie could be linked indirectly to each other.

Comment-filtering component 207 can pre-process the comments to identify a subset of comments for special processing and/or elimination. For example, the comment-filtering component could identify and eliminate low quality comments. Low quality comments can include spam, comments with abusive or vulgar language, and poorly written comments (e.g., comments with above a threshold number of grammar or spelling errors). Low quality comments can also be defined based on an author of a comment. For example, a comment by an author associated with above a threshold number of complaints by other users could be identified as low quality. Spam can include advertisements, comments with links to sites on a blacklist, computer-generated comments (in contrast to user generated), and such.

In one aspect, comments identified as low quality are identified as an initial step and excluded from any process used to generate the comment-summary interface. In other words, the low-quality comments may not be used to identify categories and are then not classified into a category or otherwise displayed. In another aspect, the low-quality comments are excluded from use in determining categories, but are then classified and accessible through the comment-summary interface.

The comment-filtering component 207 can also identify high-quality comments or comments with a particular characteristic of interest for processing. For example, comments from high-reputation authors can be isolated and used to initially identify categories or topics, as described in more detail subsequently. After the categories are identified, the remaining comments, or remaining comments that are not low-quality, could be grouped into the categories.

In one aspect, comments with a particular characteristic may be of special interest. For example, comments written during a particular time period, such as during an event (e.g., a TV program, sporting event) may be identified for special processing. As another example, comments submitted from a geographic region may be of particular interest. These comments could form a subset used to generate a comment-summary interface for comments submitted by users in the geographic region. For example, a Kansas centric comment-summary interface could be presented to a user from Kansas. The IP address associated with the user submitting the comment can be used to determine geographic region. In another aspect, user profile information can be used to determine the geographic region of a comment author.

Comment-normalization component 210 normalizes the text within comments to generate a plurality of normalized comments. Normalization can take several forms. For example, normalization can comprise changing misspelled terms to the correct spelling. In one aspect, words not found in a dictionary are identified and designated as misspelled. The misspelled words can be replaced with words from the dictionary. The replacement choice can be made using a natural language model that analyzes a context of the misspelled word in the comment. The context can also include an article associated with a comment and other comments associated with the same article. The frequency of terms used within the context can be used to determine the mostly likely replacement word for a misspelled word.

Normalization can also include slang replacement. A slang dictionary can be used to convert slang into a word or expression. The slang replacement can occur by using a slang dictionary to identify slang within a comment and then replace the slang with a corresponding word or phrase from the slang dictionary.

Normalization can also include stemming words within the comments to a root form. For example, "runs" and "running" could both be stemmed to "run." Normalization can include linking words according to meaning. The meaning of words can be taken into account when calculating similarity. For example, the sentence: "I really like going there with my kids" or "I really like going there with my children" use different units of text but the meanings are synonyms or similar. Accordingly, words that are synonyms or closely related and/or words connected through a knowledge graph can be consolidated to a single word. For example, "kid," "son," and "daughter," could all be normalized to "child."

Normalization can also include removing filler words, punctuation, and identifying sentence breaks.

N-Gram component 215 can break the comments into units of text. The units of text can be n-grams. An n-gram may be a series of characters, words, or phrases whose length may vary from 1 to n, where n is a whole number. N-grams can comprise uni-grams (one word), bi-grams (two adjacent words), and so on. The units of text can be formed by receiving the normalized text as input and then sequentially forming n-grams from the normalized text.

Frequency-analysis component 220 calculates the frequency with which each word or n-gram occurs within an individual comment and/or within a group of comments. In one aspect, Term Frequency Inverse document frequency ("TF-IDF") is used to calculate a frequency of occurrence. TF-IDF consists of computing Term Frequency (TF) and Inverse document frequency (IDF), and the TF-IDF score is the product of the two. The TF-IDF score increases proportionally to the number of times a word appears in the document, but is offset by the frequency of the word in the corpus of comments, which helps to adjust for the fact that some words appear more frequently in general. The goal of TF-IDF is to find words or n-grams that characterize a group of comments. Common words such as "the" would generate a relatively low score because "the" is found so frequently within all of the comments. On the other hand, a word such as "coach" might occur in a group of comments, but not be very common overall, producing a higher TF-IDF score.

Label component 225 can generate a group of labels or topics. In one aspect, the topics are generated by analyzing a corpus of comments according to the frequency with which distinctive words or n-grams are used in the comments. For example, the words or n-grams with a TF-IDF score above a threshold could be designated as labels or topics. The labels could then be assigned to different comments that include the topic.

In another aspect, the comments are first grouped into clusters and then the label component 225 identifies topics within the cluster. The topic or topics can then be applied to all comments within the cluster.

Clustering component 230 groups comments into subject matter clusters. The goal is to create comments within a cluster that are more similar to each other than to comments in a different cluster. The similarity can be based on common keywords, expressions, or other text. In one case, information about the user posting a comment can be used in the clustering. For example, a user may provide information about political affiliation, teams the user likes, etc. This data can be used to cluster in conjunction with the text. In another aspect, other users' interactions with a comment can be used to cluster. For example, the text of responses to a comment can be used to fit the comment into the cluster.

In one aspect, a comment can only fall into a single cluster. In another aspect, a comment could be placed into one or more clusters. In one aspect, every comment in a corpus is assigned to at least one category. Various clustering methods can be used including connectivity-based clustering (hierarchical clustering), centroid-based clustering, density-based clustering, and distribution-based clustering.

In one aspect, the relationship between comments can be taken into account when clustering. For example, a parent comment with multiple replies could be clustered together, since the replies are likely related to the single component. The relationship between comments can often form a hierarchy with the original comment being the top-level node and the replies to the comment forming child nodes.

Sentiment-analysis component 235 assigns a sentiment to a comment and/or a subject of the comment. "Poster sentiment" (or simply "sentiment") can correspond to an attitude of the poster portrayed in the comment, such as a negative, positive, or neutral attitude, which may be directed toward a subject in the comment, such as a company or product. For example, if the subject of the comment is "coach" then the sentiment-analysis component can determine whether the sentiment expressed in the comment is positive, negative, or neutral.

The sentiment-analysis component 235 can use a natural language processing method to determine sentiment of a comment. In one aspect, keyword analysis of a comment is used to classify the comment. For example, the identification of positive words such as "happy," "awesome," "great," or "fantastic" in a comment could be used to classify the comment as positive. Conversely, the identification of negative words, such as "terrible," "bad," or "sloppy" in a comment could be used to classify the comment as negative. In one aspect, domain-specific keyword analysis is used to classify comments according to sentiment. For example, a football-specific domain analysis might look for words like "drop," "broken tackle," "holding," "off sides," and similar to detect sentiment. A preliminary analysis of the primary content and the comments can be used to select a domain-specific keyword sentiment classifier.

In another aspect, machine learning methods are used to determine sentiment. In one aspect, a classifier can be trained using comments annotated with a sentiment score. For example, thousands of comments could be scored by human editors as positive, negative, or neutral. Once trained, the classifier can compare new comments of annotated comments and assign a sentiment based on a statistical similarity between the annotated comments and the new comment.

In another aspect, a grammatical analysis may be performed to understand the grammatical relationship between words in a comment. For example, the comment "Bob sacked the quarterback" expresses a positive sentiment towards Bob and a negative sentiment towards the quarterback.

Figure 4:
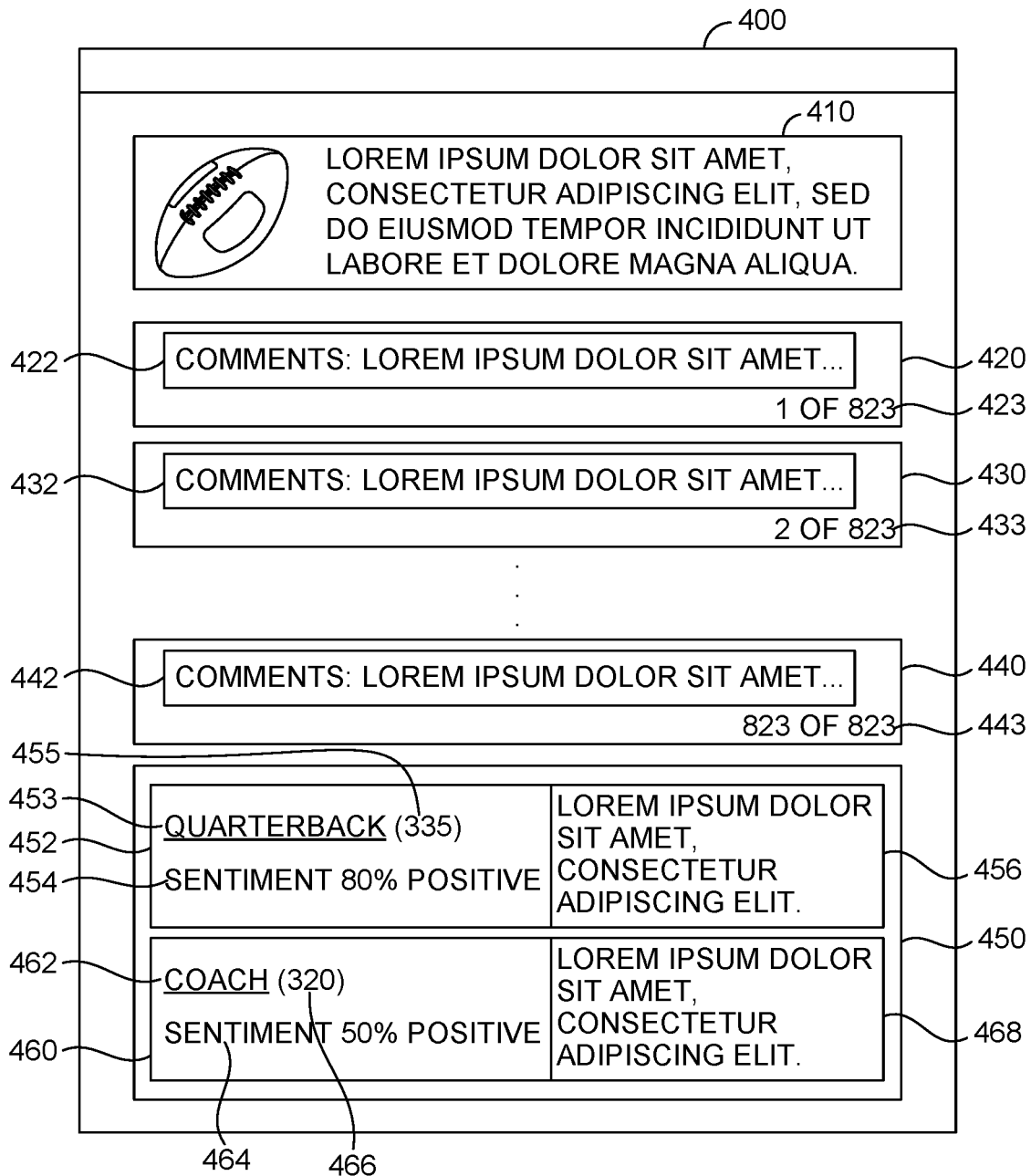
FIG. 4 is a diagram depicting a comment summary that could be presented in combination with a webpage displayed through a browser, in accordance with an aspect of the technology described herein.
Figure 5:
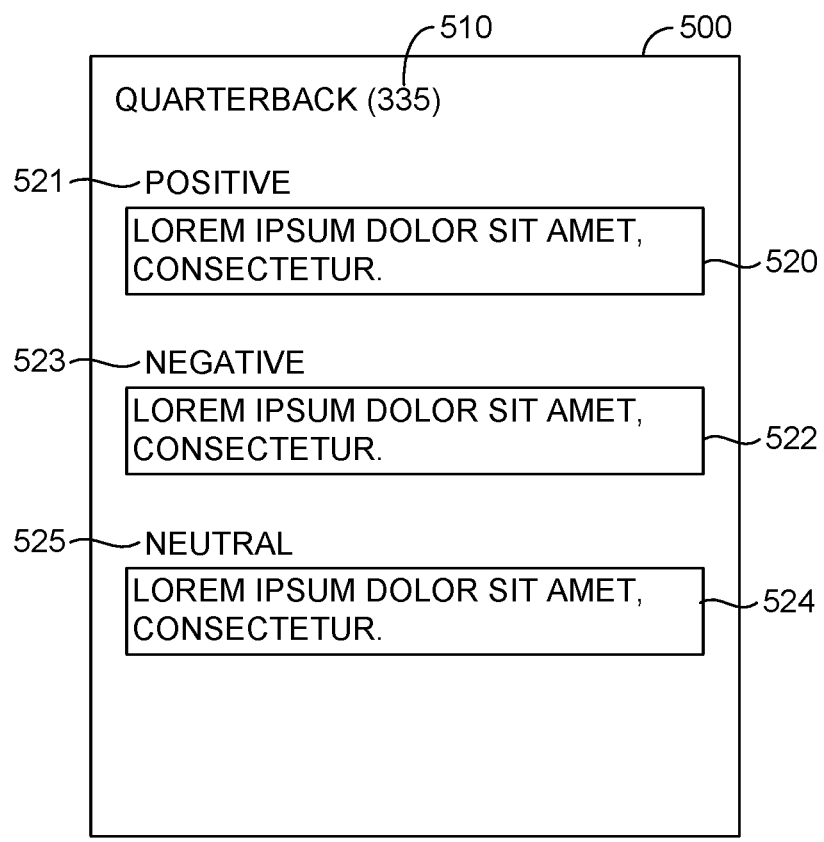
FIG. 5 is a diagram depicting a topic detail interface, in accordance with an aspect of the technology described herein.
Figure 8:
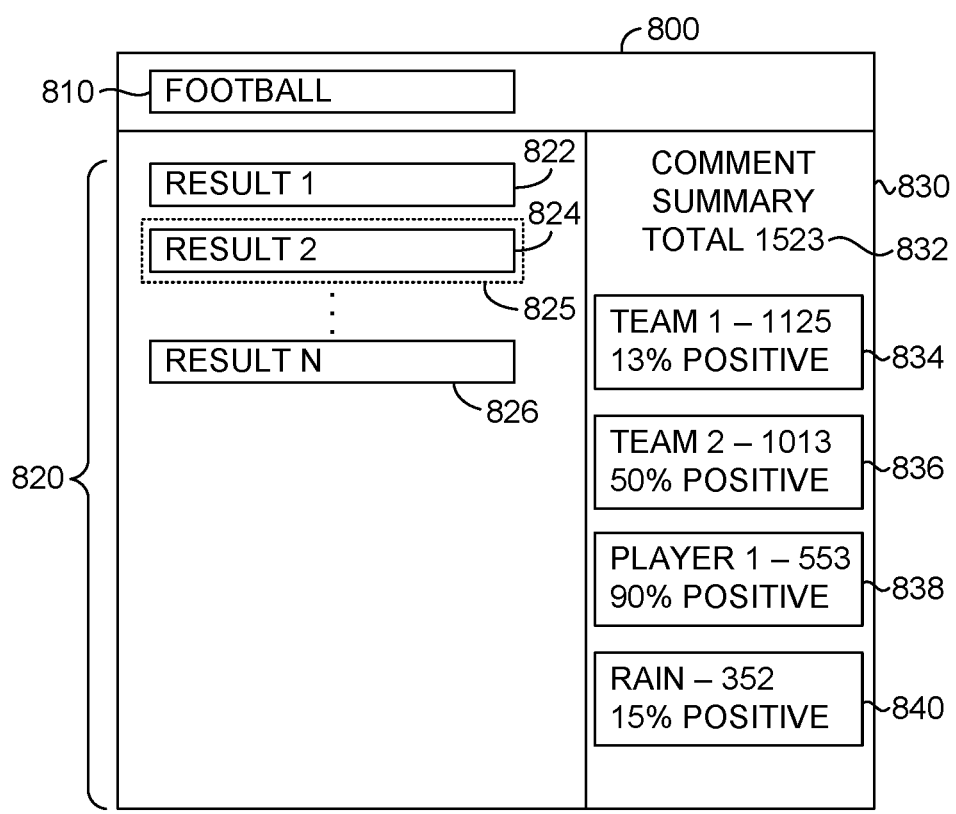
FIG. 8 is a diagram depicting a search results page including a comment summary section, in accordance with an aspect of the technology described herein.

User-interface component 240 generates a comment-summary interface that displays one or more topics or comment labels. The interface can also display one or more comments in association with the labels. FIGS. 4, 5, and 8 illustrate exemplary comment-summary interfaces.

Figure 3:
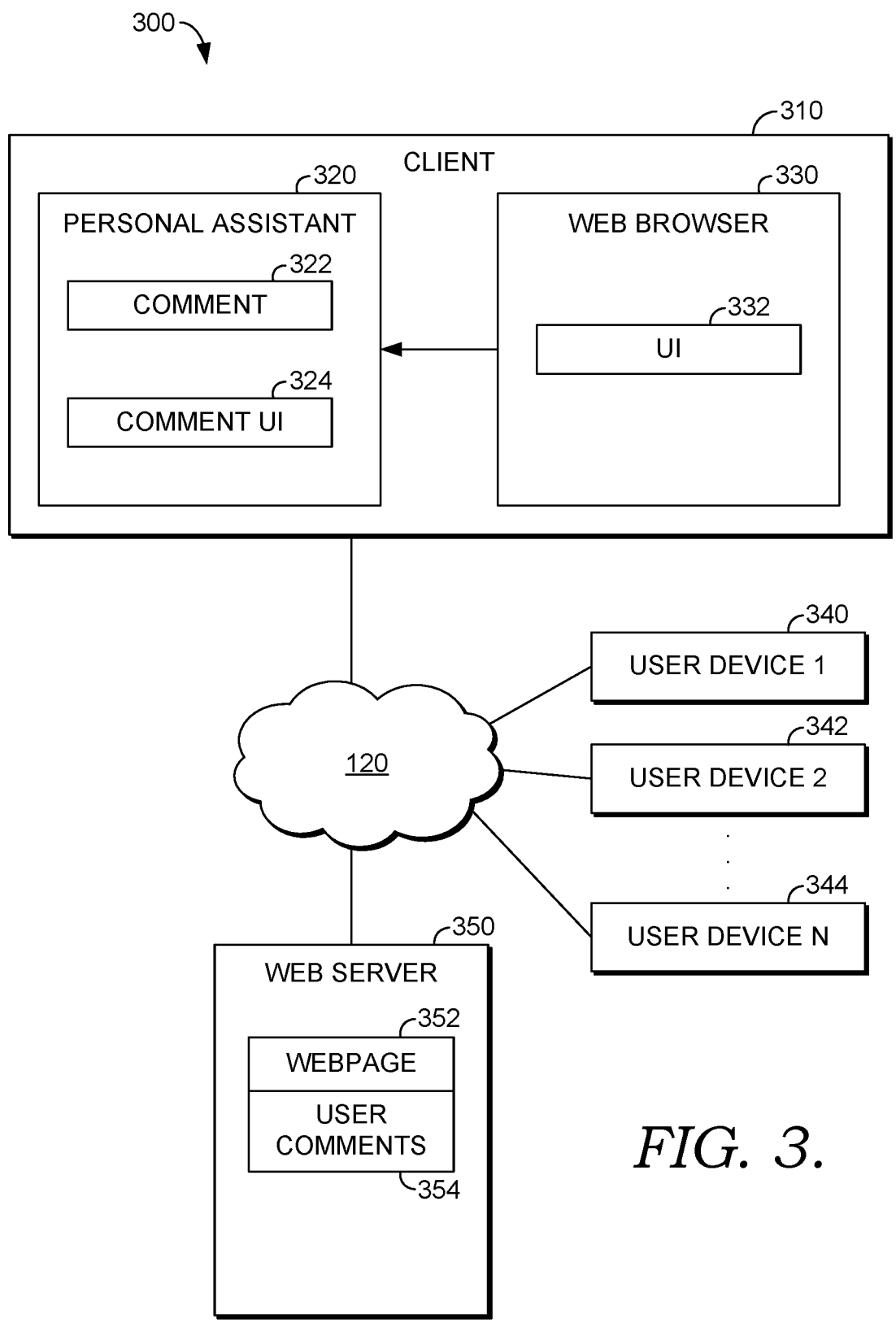
FIG. 3 is a diagram depicting a computing environment for the deployment of a personal-assistant-based comment classifier, in accordance with an aspect of the technology described herein.

Turning now to FIG. 3, a computing environment 300 for the deployment of a personal-assistant-based comment classifier 322 is illustrated, in accordance with an aspect of the present technology. As mentioned, the comment classifier, such as comment classifier 200 described previously, can be deployed in a number of different arrangements. Computing environment 300 includes client device 310, a first user device 340, a second user device 342, and an Nth user device 344, all connected through network 120 to web server 350. The designation of Nth user device 344 indicates that the computing environment 300 could include a large number of user devices including possibly millions of user devices.

The user devices can all access the web server 350 and view a webpage 352 generated by the web server 350. The web server 350 also hosts a plurality of user comments 354. User comments can be associated with a primary content on the webpage, such as a news article, a social post, a review, media content, and such. For example, an individual article posted on the webpage 352 can be associated with a plurality of comments 354 generated by users of user devices that access the webpage 352.

The comments 354 can be unstructured. The unstructured comments do not have subject matter categories or tags associated with them by the users or by a system. For example, the user is not asked to like or dislike or rate the associated news article on a scale of one to five. Instead, the user types in text which may be limited to a number of characters or words according to rules set by the web server 350 and/or the client device. Individual comments can comprise as few as a single word or contain many hundreds of words.

The client device 310 includes a personal assistant application 320 and a web browser 330. In the example shown, the web browser 330 includes a user interface component 332 in which the webpage 352 can be displayed along with the user comments 354. In one aspect, the web browser 330 communicates the webpage 352 and/or the user comments 354 to the personal assistant application 320 through a graphical user interface output by the client device 310. In another aspect, the personal assistant application 320 monitors browsing activity being performed by the web browser 330 and accesses comments associated with a webpage being browsed. In other words, different levels of cooperation and coordination between the web browser 330 and personal assistant application 320 are possible. In one aspect, no cooperation is provided and the personal assistant application 320 takes steps to retrieve any data, such as user comments, that may be needed to generate a comment summary.

The personal assistant application 320 helps the user perform tasks through the one or more computing devices, such as client device 310 and other devices associated with the user. It should be noted that implementations of the technology described herein are not limited to use with a personal assistant application 320. The technology could be deployed with web browsers, specialty applications, social media applications, and such. A user is associated with the computing device when she uses the computing device on a regular basis. The user does not need to own the computing device, for example, a user's work computer could be owned by the employer but, nevertheless, be considered "associated with the user." Similarly, a user could share a family computer with multiple people, and the family computer can be considered "associated with the user." In one aspect, a user is able to designate the devices that he or she is associated with. In one aspect, a user is associated with each device on which an instance of the personal assistant application 320 is installed and on which the user has registered his or her account information or user identification with the personal assistant application.

The personal assistant application 320 can help the user complete both computing tasks, such as sending an email or submitting a search query, and real world tasks, such as scheduling a pickup time for a user's dry cleaning on the way home from work. Real world tasks, as used herein, occur, in part, outside of computers. For example, the exchange of physical good or services is an example of a real world task. Electronic tasks occur exclusively between computing devices and users of those computing devices. Displaying through a computer display or printing the result of a computerized communication have a real world element but are, nevertheless, considered electronic tasks for this application.

The personal assistant application 320 can monitor other applications, such as web browser 330, and operating system functions. For example, the personal assistant application 320 may be able to monitor or have access to sensor data from one or more sensors on the client device 310. For example, the personal assistant application 320 may have access to accelerometer data, gyro data, GPS location data, Wi-Fi location data, image data from a camera, sound data generated by a microphone, touch data from a touchscreen, and other information. Sensor data from these sensors could be used to determine user interest in content and curators.

The personal assistant application 320 can monitor user activities within one or more other applications and store a record of this activity forming a personal data record. For example, the personal assistant application 320 could determine that the user typically reviews user comments on certain webpages, during certain times of day, or in other contextual circumstances. The personal assistant application 320 could then access a pre-prepared comment summary or generate a comment summary. The personal assistant application 320 can generate an interface that displays a comment summary to a user. The personal assistant application 320 can communicate with other services, such as a search engine, to receive a comment summary.

The comment classifier 322 can identify topics in the unstructured comments and classify comments according to the topics. The comments can be received by comment classifier 322, which can be similar to comment classifier 200 described previously. The comments may be received from the web browser 330 or retrieved from the web server 350. Other sources are also possible.

The comment classifier 322 can analyze the comments and derive one or more topics mentioned in the comments. In one aspect, method 1000, method 1100, or method 1200 are used to identify topics and classify comments. In addition to topics, the sentiments expressed with each comment can be analyzed. The individual sentiments can be aggregated to form an overall sentiment score for the topic. The comment classifier 322 can communicate the topics, sentiments, comments, and other information to the comment user interface 324.

The comment user interface 324 can generate a user interface that provides a comment summary. The comment summary can list a plurality of topics identified in the comments. In addition, with each topic, a plurality of representative comments can be shown as well as a sentiment associated with the comments or the topic. The comments shown as representative can be selected according to a number of sub-comments linked to a comment, reputation of the comment's author, or through other selection mechanisms.

The comment user interface 324 can output a user interface through the personal assistant application 320 that can appear as a pop-up interface over a portion of the web browser's 330 interface. In one aspect, the comment-summary interface can be off to the side or cover an area of white space on the web browser interface. The comment interface can be presented as part of an interface that is the same size and shape as an interface typically generated by the personal assistant application 320. This consistency communicates to the user that the comment-summary interface is provided by the personal assistant.

In one aspect, in conjunction with presenting the interface, an audible annotation can be output to the user announcing the interface. For example, the personal assistant application can provide an audible annotation expressing, "I've summarized the comments from this article for you."

Turning now to FIG. 4, a comment-summary interface 450 that could be presented in combination with a webpage displayed through a web browser 400 is shown, in accordance with an aspect of the technology described herein. FIG. 4 includes a web browser 400 showing the tail end of a sports article 410. Underneath the sports article 410 are a group of user-generated comments. The comments include a first comment 420, a second comment 430, and an 823rd comment 440. Each comment includes user-generated text and a count indicator. User-generated text is generated by users reading the sports article 410. The webpage may provide a user comment interface through which the user can enter text that is then displayed as a comment. The first comment 420 includes text 422 and count indicator 423 indicating that the first comment 420 is 1 of 823 comments. The second comment 430 includes text 432 and count indicator 433. The 823rd comment 440 includes user-generated text 442 and a count indicator 443.

The comment-summary interface 450 can be generated by a web browser, the personal assistant application, the web server, or some other application. The comment-summary interface 450 can be located in various places. The comment-summary interface 450 is shown beneath the comments, but could be located off to the side or as a pop-up window covering one or more comments, at least, in part. In one aspect, the comment-summary interface 450 is presented as a partially translucent overlay through which underlying comments can be viewed. The comment-summary interface can become non-translucent upon the user interacting with the interface. On the other hand, upon the expiration of a period of time without a user interaction, the comment summary can disappear or be minimized to an icon in a notification panel or elsewhere on the user interface. Upon clicking the icon, the comment summary can reappear.

In this simplified example, the comment-summary interface 450 includes two categories for topics. The terms categories and topics can be used interchangeably. Both terms refer to subject matter mentioned in a comment. For the sake of illustration, the article 410 describes a football game and the comments relate to the football game. The first comment summary 452 is related to quarterbacks and the second summary 460 is related to a coach. The first summary 452 includes a quarterback label 453 and total comments indicator 455 showing that 335 comments are related to the quarterback. A sentiment score 454 indicates that the user sentiments in the comments are 80% positive. Although the category label is quarterback, the comments associated with the quarterback category do not necessarily have to mention the word quarterback. For example, some comments could mention the name of a quarterback. A knowledge base could be used to associate the name with the position "quarterback." Similarly, the first or last name of a quarterback could be mentioned in many of the comments and combined under the same label. Natural language processing can be used to map other actions associated with a quarterback, such as throwing a touchdown, throwing an interception, getting sacked, to the term quarterback even though the quarterback is not actually mentioned in the comments. In such comments, the actor is implied and can be ascertained through natural language processing.

The second summary 460 is annotated with the label coach 462. The comment count indicator 466 shows that 320 comments are related to the coach. The sentiment of the comments is running 50% positive for the coach. Presumably, the article 410 in this example mentions both the coach and quarterback associated with a football game. Both sections can show snippets of comments or entire comments. The first summary 452 includes a comment section 456, and the second summary 460 includes a comment section 468. Clicking on the first summary 452 can open a topic detail interface for comments related to the quarterback, and clicking on the second summary 460 can open a topic detail interface for comments related to the coach.

Turning now to FIG. 5, a topic detail interface 500 is shown, in accordance with an aspect of the technology described herein. The topic detail interface 500 can be accessed, for example, by clicking the first summary interface 452. The topic detail interface 500 can provide more granular details, including possibly subtopics and a more detailed sentiment analysis, about the selected topic or subtopics.

The topic detail interface 500 includes a topic descriptor 510 and a plurality of user comments sorted by sentiment. For the sake of simplicity, only three sentiments are shown and only a single comment is shown under each sentiment. An implementation could show multiple comments under each sentiment and more than three different sentiments. The user comments include a first user comment 520, a second user comment 522, and a third user comment 524. The first user comment 520 is associated with a positive sentiment 521. The second user comment 522 is associated a negative sentiment 523. The third user comment 524 is associated with a neutral sentiment 525. Other sentiments are possible; positive, negative, and neutral are shown here for the sake of illustration. Though not shown, additional comments under each sentiment could be accessed by scrolling the interface to the next comments.

Figure 6:
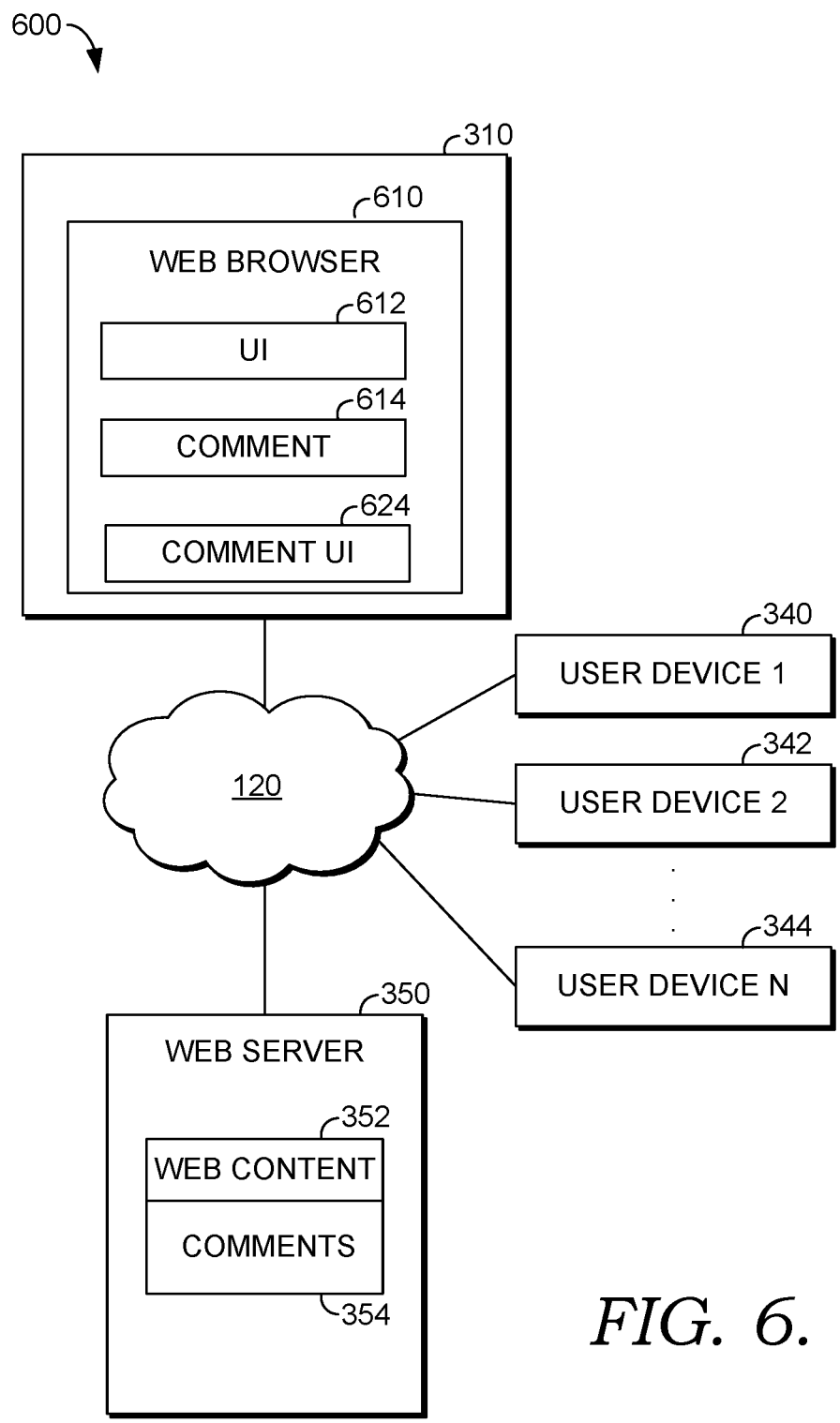
FIG. 6 is a diagram depicting a computing environment for the deployment of a browser-based comment classifier, in accordance with an aspect of the technology described herein.

Turning now to FIG. 6, a computing environment 600 for the deployment of a browser-based comment classifier 614 is illustrated, in accordance with an aspect of the present technology. As mentioned, the comment classifier, such as comment classifier 200 described previously, can be deployed in a number of different arrangements. Computing environment 600 includes client device 310, a first user device 340, a second user device 342, and an Nth user device 344, all connected through network 120 to web server 350. The designation of Nth user device 344 indicates that the computing environment 600 could include a large number of user devices including possibly millions of user devices.

The client device 310 includes a web browser 610. In the example shown, the web browser 610 includes a user-interface component 612 in which the webcontent 352 can be displayed along with the user comments 354.

The comment classifier 614 can identify topics in the unstructured comments and generate a comment summary. The comments can be received by comment classifier 614, which can be similar to comment classifier 200 described previously. The comments may be received from the web browser 610 or retrieved from the web server 350. Other sources are also possible.

The comment classifier 614 can analyze the comments and derive one or more topics mentioned in the topics. In one aspect, method 1000, method 1100, or method 1200 are used to identify topics. In addition to topics, the sentiments expressed with each comment can be analyzed. The individual sentiments can be aggregated to form an overall sentiment score for the topic. The comment classifier 614 can communicate the topics, sentiments, comments, and other information to the comment user interface 624.

The comment user interface 624 can generate a user interface that provides a comment summary. The comment summary can list a plurality of topics identified in the comments. In addition, with each topic, a plurality of representative comments can be shown as well as a sentiment associated with the comments or the overall category. The comments shown as representative can be selected according to a number of sub-comments linked to a comment, reputation of the comment's author, or through other selection mechanisms. Exemplary comment interfaces are described with reference to FIGS. 4, 5, and 8.

Figure 7:
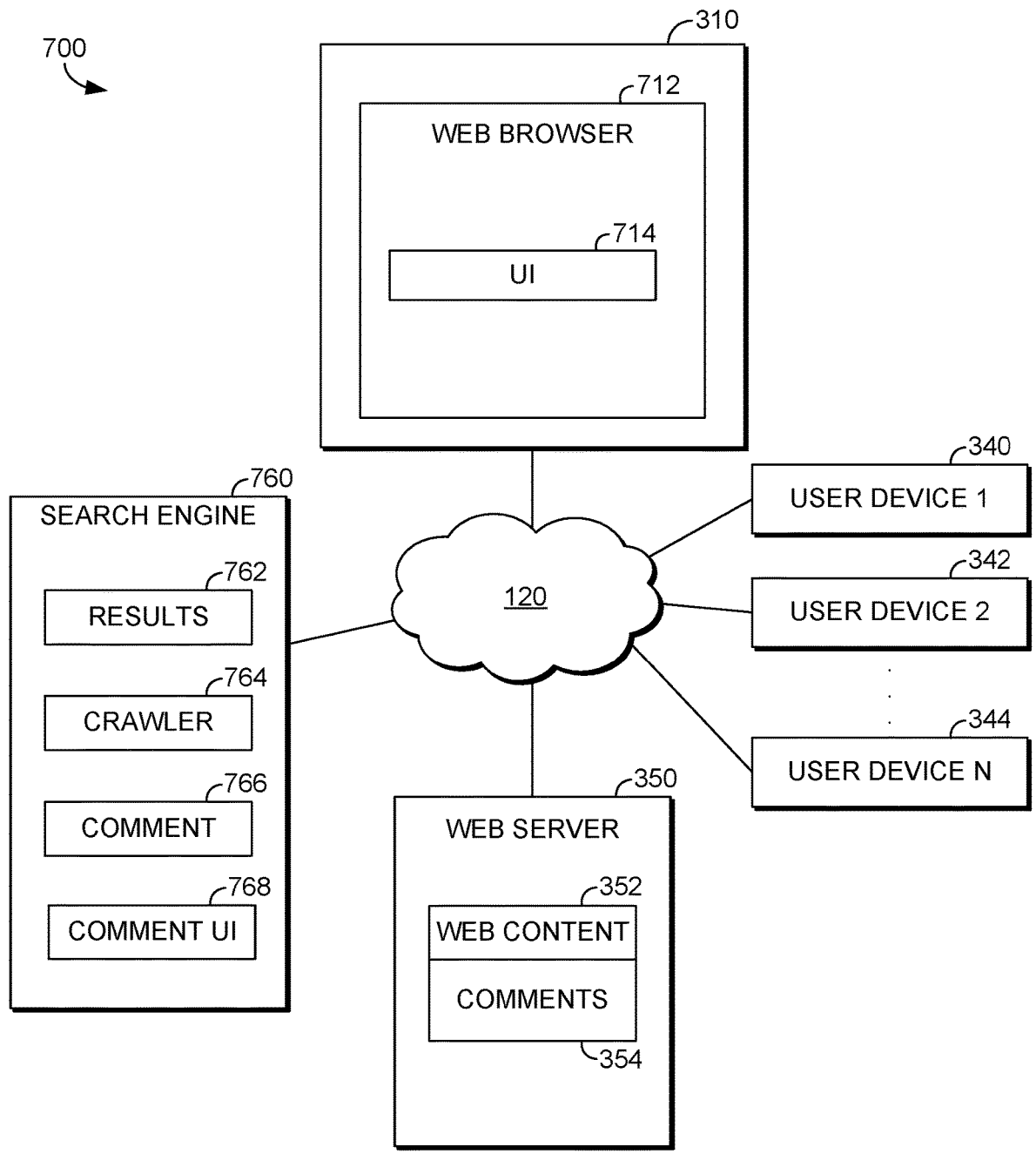
FIG. 7 is a diagram depicting a computing environment for the deployment of a search-engine-based comment classifier, in accordance with an aspect of the technology described herein.

Turning now to FIG. 7, a computing environment 700 for the deployment of a search-engine-based comment classifier 766 is illustrated, in accordance with an aspect of the present technology. As mentioned, the comment classifier, such as comment classifier 200 described previously, can be deployed in a number of different arrangements. Computing environment 700 includes client device 310, a first user device 340, a second user device 342, and an Nth user device 344, all connected through network 120 to web server 350, and search engine 760. The designation of Nth user device 344 indicates that the computing environment 700 could include a large number of user devices including possibly millions of user devices.

The user devices can all access the web server 350 and view a webcontent 352 generated by the web server 350. The web server 350 also hosts a plurality of user comments 354. User comments can be associated with a primary content on the webpage, such as a news article, a social post, a review, media content, and such. For example, an individual article posted on the webpage 352 can be associated with a plurality of comments 354 generated by users of user devices that access the webpage 352.

The comments 354 can be unstructured. The unstructured comments do not have subject matter categories or tags associated with them by the users or by a system. For example, the user is not asked to like or dislike or rate the associated news article on a scale of one to five. Instead, the user types in text which may be limited to a number of characters or words according to rules set by the web server 350. Individual comments can comprise as few as a single word or contain many hundreds of words.

The client device 310 includes a web browser 712. In the example shown, the web browser 712 includes a user-interface component 714 in which the webpage 352 can be displayed along with the user comments 354.

The search engine 760 can receive a query and generate search results. The search results can be generated by results component 762. The results component 762 can find websites that are responsive to a query and rank the results according to relevance. One or more of the websites could be associated with a primary content and user comments. Upon detecting user comments associated with a website to be shown as part of a search results page, the results component 762 could trigger the comment classifier 766 to generate a comment-summary interface for the comments shown on the webpage. The web crawler 764 can traverse the Internet and retrieve webpages. The webpages traversed could be analyzed for keywords and other information that are put into an index that is used by the results component 762 to identify relevant search results.

The comment classifier 766 can identify topics in the unstructured comments and classify comments according to the topics. The comments can be received by comment classifier 766, which can be similar to comment classifier 200 described previously.

The comment classifier 766 can analyze the comments and derive one or more topics mentioned in the topics. In one aspect, method 1000, method 1100, or method 1200 are used to identify topics and classify comments. In addition to topics, the sentiments expressed with each comment can be analyzed. The individual sentiments can be aggregated to form an overall sentiment score for the topic. The comment classifier 766 can communicate the topics, sentiments, comments, and other information to the comment user interface component 768.

The comment user interface component 768 can generate a user interface that provides a comment summary. The comment summary can list a plurality of topics identified in the comments. In addition, with each topic, a plurality of representative comments can be shown as well as a sentiment associated with the comments or the topic. The comments shown as representative can be selected according to a number of sub-comments linked to a comment, reputation of the comment's author, or through other selection mechanisms. The comment user interface component 768 can output a user interface as part of a search results webpage, as shown in FIG. 8.

Turning now to FIG. 8, a search-results page 800 including a comment-summary interface 830 is shown, in accordance with an aspect of the technology described herein. The search-results page 800 could be displayed in a web browser running on a user device. The contents of the search-results page 800 could be provided by a search service.

In this example, the user enters the query "football" in query input box 810. A series of search results 820 that are responsive to the query "football" are shown in the search results section. The search results include a first result 822, a second search result 824, and an Nth result 826. The dashed box 825 indicates that a user has selected the second result 824. Selection can mean hovering over a result or otherwise expressing interest. Selecting can also mean clicking on the result. Upon the user expressing interest in the second search result 824, the comment-summary interface 830 outputs a content analysis. The content summary indicates how many comments are associated with the second search result 824. In this case, the second search result could be a news article, a product review, or similar content that allows users to associate their own user-generated comments with the primary content.

The comment-summary interface 830 includes four topic summaries. The first topic summary 834 indicates that there are 1,125 comments related to team 1. Thirteen percent of those comments are positive. The second topic summary 836 is for the 1,013 comments that mention team 2. Fifty percent of the comments related to team 2 are positive. The third topic summary 838 shows that 553 comments are related to player 1. The comments for player 1 were 90% positive. The fourth topic summary 840 indicates that 352 comments mentioned rain. The comments about rain were 15% positive. The example of rain illustrates how difficult it could be to pre-structure comments to identify topics or have the users identify topics in advance. For example, in the sporting context, it could be difficult to anticipate that an individual sporting event could involve or be impacted by rain.

In another aspect, the search-results based comment summary can use the query as the primary content and the search results as the comments. In one aspect, a top threshold of search results are summarized, for example, the top 100 search results or the top 1,000 search results or the top 10,000 search results or more are summarized.

Figure 9:
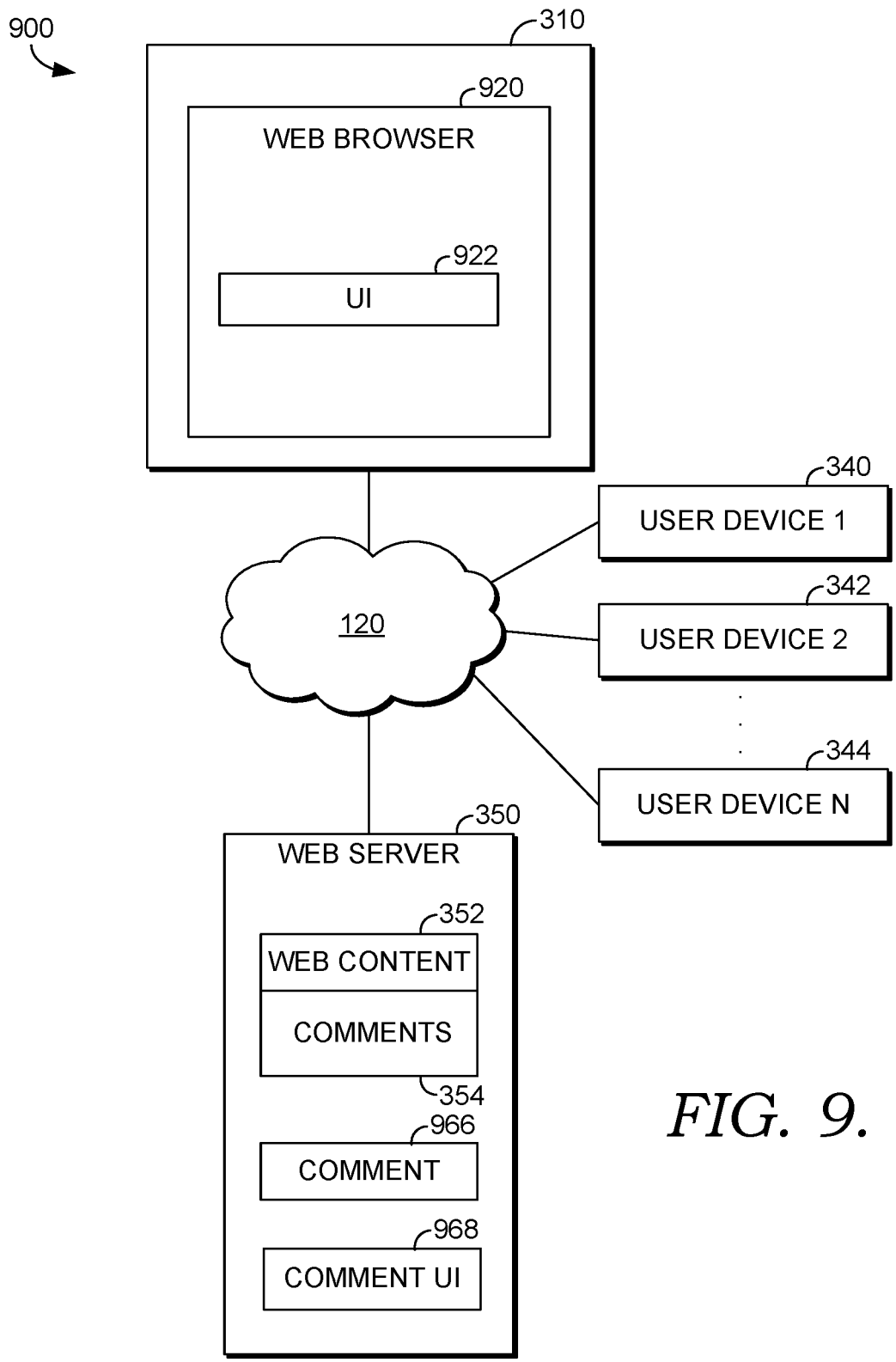
FIG. 9 is a diagram depicting a computing environment for the deployment of a web-server-based comment classifier, in accordance with an aspect of the technology described herein.

Turning now to FIG. 9, a computing environment 900 for the deployment of a webpage-based comment classifier 922 is illustrated, in accordance with an aspect of the present technology. As mentioned, the comment classifier, such as comment classifier 200 described previously, can be deployed in a number of different arrangements. Computing environment 900 includes client device 310, a first user device 340, a second user device 342, and an Nth user device 344, all connected through network 120 to web server 350. The designation of Nth user device 344 indicates that the computing environment 900 could include a large number of user devices including possibly millions of user devices.

The user devices can all access the web server 350 and view a webcontent 352 generated by the web server 350. The web server 350 also hosts a plurality of user comments 354. User comments can be associated with a primary content on the webpage, such as a news article, a social post, a review, media content, and such. For example, an individual article posted on the webpage 352 can be associated with a plurality of comments 354 generated by users of user devices that access the webpage 352.

The comments 354 can be unstructured. The unstructured comments do not have subject matter categories or tags associated with them by the users or by a system. For example, the user is not asked to like or dislike or rate the associated news article on a scale of one to five. Instead, the user types in text which may be limited to a number of characters or words according to rules set by the web server 350. Individual comments can comprise as few as a single word or contain many hundreds of words.

The client device 310 includes a web browser 920. In the example shown, the web browser 920 includes a user-interface component 922 in which the webpage 352 can be displayed along with the user comments 354.

The comment classifier 966 can identify topics in the unstructured comments and classify comments according to the topics. The comments can be received by comment classifier 966, which can be similar to comment classifier 200 described previously.

The comment classifier 966 can analyze the comments and derive one or more topics mentioned in the topics. In one aspect, method 1000, method 1100, or method 1200 are used to identify topics and classify comments. In addition to topics, the sentiments expressed with each comment can be analyzed. The individual sentiments can be aggregated to form an overall sentiment score for the topic. The comment classifier 966 can communicate the topics, sentiments, comments, and other information to the comment user interface component 968.

The comment user interface component 968 can generate a user interface that provides a comment summary. The comment summary can list a plurality of topics identified in the comments. In addition, with each topic, a plurality of representative comments can be shown as well as a sentiment associated with the comments or the topic. The comments shown as representative can be selected according to a number of sub-comments linked to a comment, reputation of the comment's author, or through other selection mechanisms. The comment-summary interface can be displayed adjacent to the comments section of the website.

Figure 10:
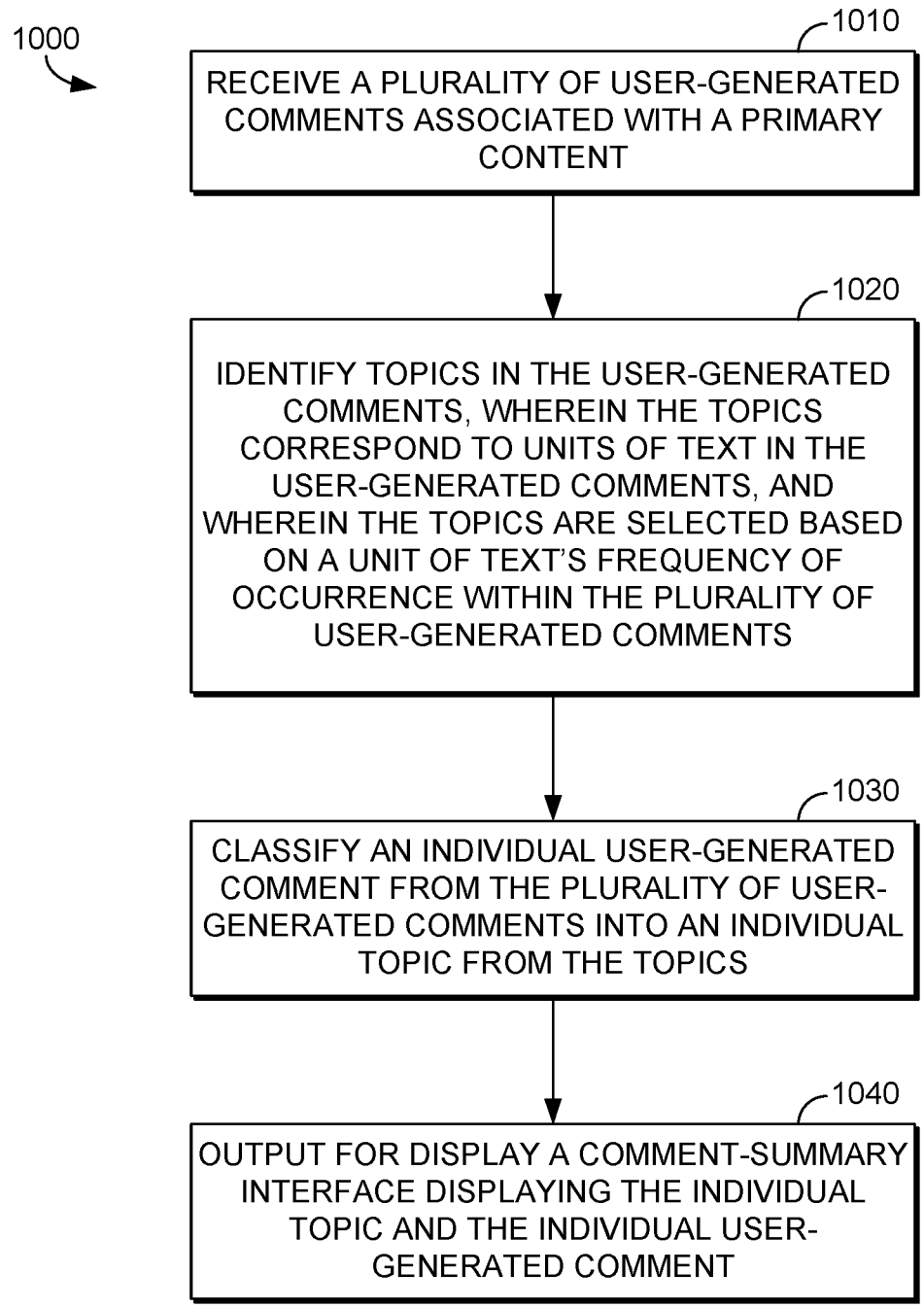
FIG. 10 is a diagram depicting a method categorizing unstructured user comments, in accordance with an aspect of the technology described herein.

Turning now to FIG. 10, a method 1000 of categorizing unstructured comments is provided, according to an aspect of the technology described herein. Method 1000 could be performed on a client device by a personal assistant application, a web browser application, or through some other application. The method 1000 could also be performed by a search engine, a website that hosts content and associated comments, or through a combination of client side and data center based applications.

At step 1010, a plurality of user-generated comments associated with a primary content are received. The comments can be received from a data source, such as a media server, or could be retrieved from a browser that has retrieved the comments for display. The comments can be associated with a primary content, such as a news article or social post. As mentioned, the comments can be unstructured and unlabeled. In other words, the comments are not categorized by subject matter when received. The primary content can be a news article posted on a website, a product for sale through a website, a social post, and the like. In one aspect, the primary content is any content that is associated with comments about the primary content. The comments can be stored locally for analysis.

As used herein, a comment is a textual content that is in a direct or indirect relationship with a primary content. A direct relationship is present when the primary content and the comment are associated by a user. For example, a reply to a first comment on a news article associates the first comment and the reply through a direct relationship.

An indirect relationship is based on a common feature of comments. For example, all comments by a single author could be indirectly related. All comments in a specific user's social network could be indirectly related. All social posts with the same hashtag could be indirectly related. All reviews of a restaurant, product, or place can be indirectly linked to each other. For example, all reviews of a movie could be linked indirectly to each other.

The plurality of user-generated comments can be filtered, for example, as explained previously with reference to the comment-filter component 207. Accordingly, the plurality of comments can exclude low-quality comments. In another aspect, the plurality of comments can include only high-quality comments or comments with a particular characteristic of interest.

At step 1020, topics in the user-generated comments are identified. The topics correspond to units of text in the user-generated comments. The topics are selected based on a unit of text's frequency of occurrence within the plurality of user-generated comments. In one aspect, the topics are identified without using a predefined corpus of topics. In another aspect, topics identified from the user-identified topics are combined with preselected topics to form a final set of topics.

In one aspect, the text of each comment is normalized and then broken into n-grams. The normalization can occur as described previously with reference to normalization component 210. An n-gram may be a series of characters, words, or phrases whose length may vary from 1 to n, where n is a whole number. N-grams can comprise uni-grams (one word), bi-grams (two adjacent words), and so on. The units of text can be formed by receiving the normalized text as input and then sequentially forming n-grams from the normalized text.

The frequency with which each word or n-gram occurs within an individual comment and/or within a group of comments can be determined in different ways. In one aspect, Term Frequency Inverse document frequency ("TF-IDF") is used to calculate a frequency of occurrence. TF-IDF consists of computing Term Frequency (TF) and Inverse document frequency (IDF), and the TF-IDF score is the product of the two. The TF-IDF score increases proportionally to the number of times a word appears in the document, but is offset by the frequency of the word in the corpus of comments, which helps to adjust for the fact that some words appear more frequently in general. The goal of TF-IDF is to find words or n-grams that characterize a group of comments. Common words such as "the" would generate a relatively low score because "the" is found so frequently within all of the comments. On the other hand, a word such as "coach" might occur in a group of comments, but not be very common overall, producing a higher TF-IDF score.

In one aspect, the words or n-grams with a TF-IDF score above a threshold is designated as a topic. In another aspect, the top threshold (for example 15) words or n-grams are designated as a topic.

At step 1030, an individual user-generated comment from the plurality of user-generated comments is classified into an individual topic from the topics. Step 1030 may be repeated until each comment is classified into one or more topics. The comment may be classified according to a match between a keyword in the comment and the topic. In one case, a knowledge base is used to find relationships between a topic and words in a comment. For example, the knowledge base may know that "Bob Smith" and "#12" are both terms related to quarterback. Other classification methods are possible.

In one aspect, the relationship between comments can be taken into account when classifying. For example, a parent comment with multiple replies could be classified together, since the replies are likely related to the single component. The relationship between comments can often form a hierarchy with the original comment being the top-level node and the replies to the comment forming child nodes.

At step 1040, a comment-summary interface displaying the individual topic and the individual user-generated comment is output for display. The comment-summary interface may be displayed through a personal assistant application, as part of a search results page, through a browser-generated interface, or by the host of the primary content. The comment-summary interface can provide multiple topics with one or more comments under each topic. In one aspect, the user can open an interface showing all comments related to the topic by selecting the topic. The comment-summary interface can also display the sentiment of individual comments or all comments in the topic. In one aspect, a user can be provided a view of only positive or only negative comments under a particular topic. The comment-summary interface can be similar to the interfaces described previously in FIGS. 4, 5, and 8.

Figure 11:
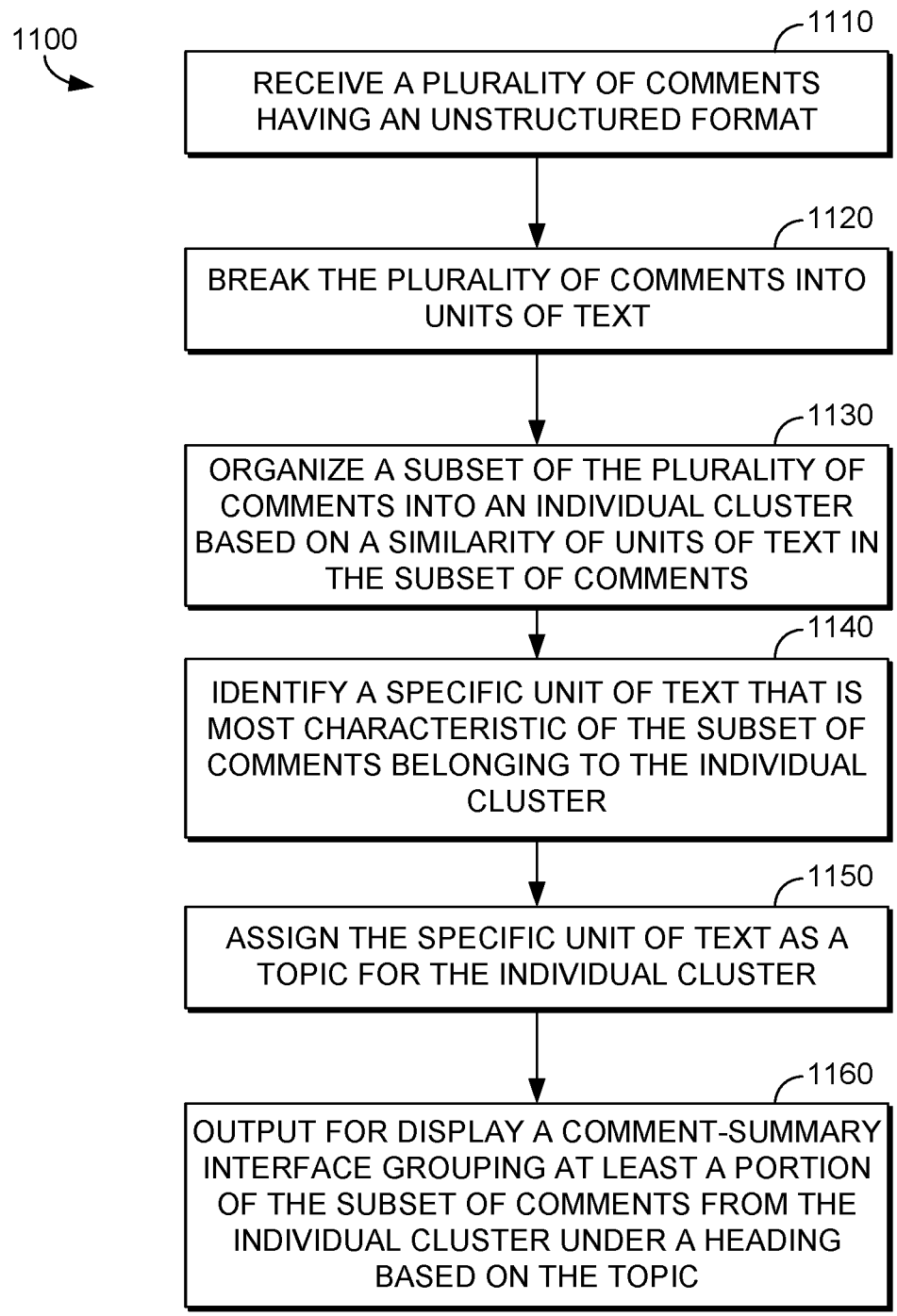
FIG. 11 is a diagram depicting a method categorizing unstructured user comments, in accordance with an aspect of the technology described herein.

Turning now to FIG. 11, a method 1100 of categorizing unstructured comments is provided, according to an aspect of the technology described herein. Method 1100 could be performed on a client device by a personal assistant application, a web browser application, or through some other application. The method 1100 could also be performed by a search engine, a website that hosts content and associated comments, or through a combination of client side and data center based applications.

At step 1110, a plurality of comments having an unstructured format are received. The comments can be received from a data source, such as a media server, or could be retrieved from a browser that has retrieved the comments for display. The comments can be associated with a primary content, such as a news article or social post. As mentioned, the comments can be unstructured and unlabeled. In other words, the comments are not categorized by subject matter when received. The primary content can be a news article posted on a website, a product for sale through a website, a social post, and the like. In one aspect, the primary content is any content that is associated with comments about the primary content. The comments can be stored locally for analysis.

As used herein, a comment is a textual content that is in a direct or indirect relationship with a primary content. A direct relationship is present when the primary content and the comment are associated by a user. For example, a reply to a first comment on a news article associates the first comment and the reply through a direct relationship.

An indirect relationship is based on a common feature of comments. For example, all comments by a single author could be indirectly related. All comments in a specific user's social network could be indirectly related. All social posts with the same hashtag could be indirectly related. All reviews of a restaurant, product, or place can be indirectly linked to each other. For example, all reviews of a movie could be linked indirectly to each other.

The plurality of user-generated comments can be filtered, for example, as explained previously with reference to the comment-filter component 207. Accordingly, the plurality of comments can exclude low-quality comments. In another aspect, the plurality of comments can include only high-quality comments or comments with a particular characteristic of interest.

At step 1120, the method includes breaking the plurality of comments into units of text. In one aspect, the text of each comment is normalized and then broken into n-grams. The normalization can occur as described previously with reference to normalization component 210. An n-gram may be a series of characters, words, or phrases whose length may vary from 1 to n, where n is a whole number. N-grams can comprise uni-grams (one word), bi-grams (two adjacent words), and so on. The units of text can be formed by receiving the normalized text as input and then sequentially forming n-grams from the normalized text.

At step 1130, a subset of the plurality of comments is organized into an individual cluster based on a similarity of units of text in the subset of comments. The goal is to create comments within a cluster that are more similar to each other than to comments in a different cluster. The similarity can be based on common keywords, expressions, or other text. The meaning of words can be taken into account when calculating similarity. For example, the sentence: "I really like going there with my kids" or "I really like going there with my children" use different units of text but the meanings are synonyms or similar. Accordingly, words that are synonyms or closely related and/or words connected through a knowledge graph can be considered similar.

In one case, information about the user posting a comment can be used in the clustering. For example, a user may provide information about political affiliation, teams the user likes, etc. This data can be used to cluster in conjunction with the text. In another aspect, other users' interactions with a comment can be used to cluster. For example, the text of responses to a comment can be used to fit the comment into the cluster.

In one aspect, the relationship between comments can be taken into account when clustering. For example, a parent comment with multiple replies could be clustered together, since the replies are likely related to the single component. The relationship between comments can often form a hierarchy with the original comment being the top-level node and the replies to the comment forming child nodes.

In one aspect, a comment can only fall into a single cluster. In another aspect, a comment could be placed into one or more clusters. In one aspect, every comment in a corpus is assigned to at least one category. Various clustering methods can be used including connectivity-based clustering (hierarchical clustering), centroid-based clustering, density-based clustering, and distribution-based clustering.

At step 1140, a specific unit of text (e.g., word or n-gram) that is most characteristic of the subset of comments belonging to the individual cluster is identified. In one aspect, more than one unit of text can be associated with a cluster when the TF-IDF score for units of text are within a threshold. In one aspect, Term Frequency Inverse document frequency ("TF-IDF") is used to calculate words that are most characteristic of the subset. All of the comments from the cluster can be input into a TF-IDF analysis. TF-IDF consists of computing Term Frequency (TF) and Inverse document frequency (IDF), and the TF-IDF score is the product of the two. The TF-IDF score increases proportionally to the number of times a word appears in the document, but is offset by the frequency of the word in the corpus of comments, which helps to adjust for the fact that some words appear more frequently in general. The goal of TF-IDF is to find words or n-grams that characterize a group of comments. Common words such as "the" would generate a relatively low score because "the" is found so frequently within all of the comments. On the other hand, a word such as "coach" might occur in a group of comments, but not be very common overall, producing a higher TF-IDF score. Words with the highest TF-IDF score can be used as the topic or label for the cluster.

At step 1150, the specific unit of text is assigned as a topic for the individual cluster. In one aspect, words with the highest TF-IDF score can be used as the topic or label for the cluster.

At step 1160, a comment-summary interface displaying at least a portion of the subset of comments from the individual cluster under a heading based on the topic is output for display. The comment-summary interface may be displayed through a personal assistant application, as part of a search results page, through a browser-generated interface, or by the host of the primary content. The comment-summary interface can provide multiple topics with one or more comments under each topic. In one aspect, the user can open an interface showing all comments related to the topic by selecting the topic. The comment-summary interface can also display the sentiment of individual comments or all comments in the topic. In one aspect, a user can be provided a view of only positive or only negative comments under a particular topic. The comment-summary interface can be similar to the interfaces described previously in FIGS. 4, 5, and 8.

Figure 12:
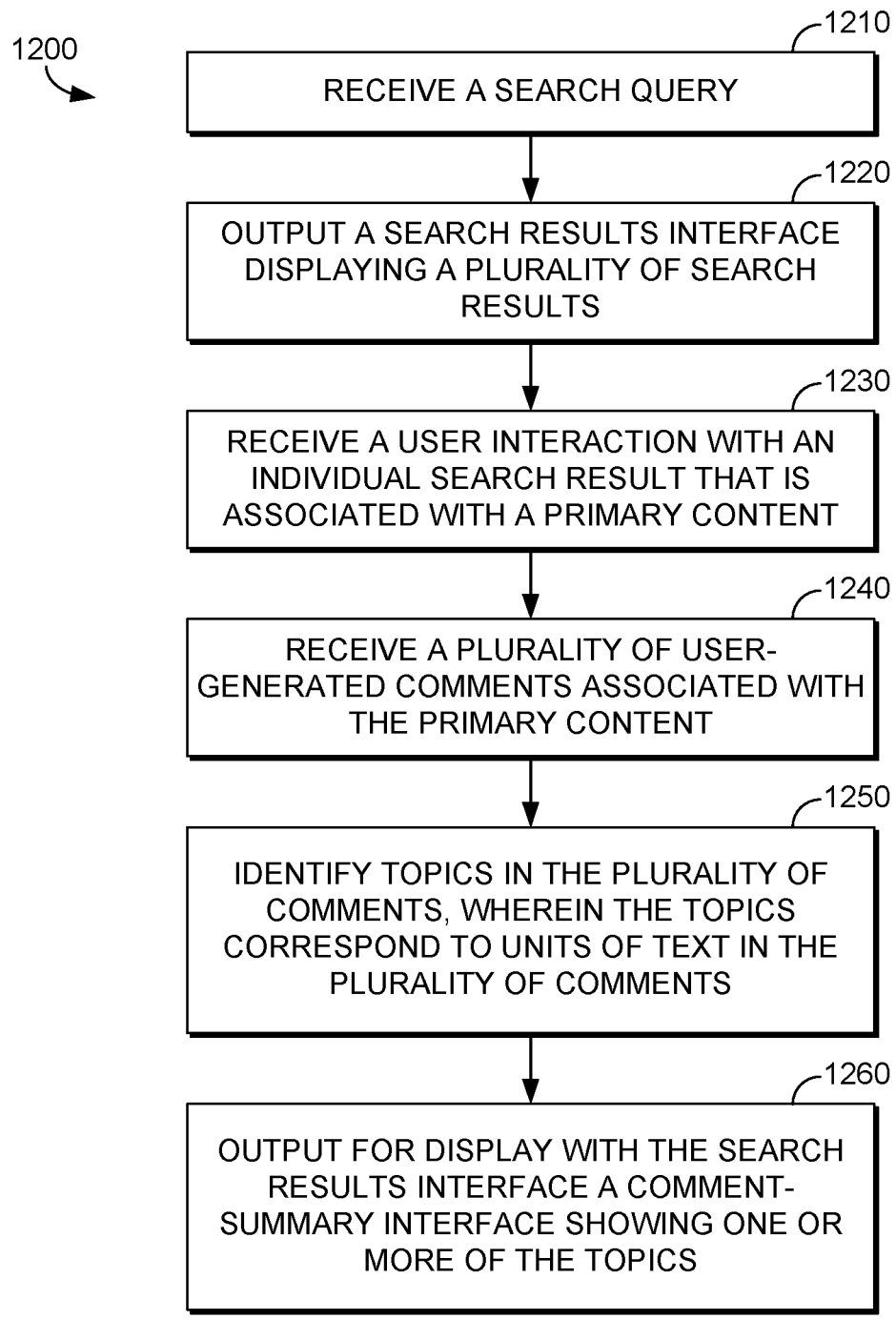
FIG. 12 is a diagram depicting a method of categorizing unstructured user comments, in accordance with an aspect of the technology described herein.

Turning now to FIG. 12, a method 1200 of categorizing unstructured comments is provided, according to an aspect of the technology described herein. Method 1200 could be performed on a client device by a personal assistant application, a web browser application, or through some other application. The method 1200 could also be performed by a search engine, a website that hosts content and associated comments, or through a combination of client side and data center based applications.

At step 1210, a search query is received. The search query can be received by a personal assistant application, for example, as a verbal request. The search query could be entered into a search engine page or through a browser query input box.

At step 1220, a search results interface displaying a plurality of search results is output for display. The search results can be generated by a search engine. If the query is not directly input into a search application, then the application that receives the query can communicate it to a search engine and receive a set of relevant search results in return. The search results can then be presented to a user. One or more of the search results can comprise a link to a webpage with primary content. Primary content can be media content that is associated with comments through a direct or indirect relationship. The user-input comments can be generated by the public, members of a website, members of a social media network, etc.

At step 1230, a user interaction with an individual search result that is associated with a primary content is received. For example, the user may hover over a search result or click on the search result.

At step 1240, a plurality of user-generated comments associated with the primary content is received. The comments can be received from a data source, such as a media server, or could be retrieved from a browser that has retrieved the comments for display. The comments can be associated with a primary content, such as a news article or social post. As mentioned, the comments can be unstructured and unlabeled. In other words, the comments are not categorized by subject matter when received. The primary content can be a news article posted on a website, a product for sale through a website, a social post, and the like. In one aspect, the primary content is any content that is associated with comments about the primary content. The comments can be stored locally for analysis.

As used herein, a comment is a textual content that is in a direct or indirect relationship with a primary content. A direct relationship is present when the primary content and the comment are associated by a user. For example, a reply to a first comment on a news article associates the first comment and the reply through a direct relationship.

An indirect relationship is based on a common feature of comments. For example, all comments by a single author could be indirectly related. All comments in a specific user's social network could be indirectly related. All social posts with the same hashtag could be indirectly related. All reviews of a restaurant, product, or place can be indirectly linked to each other. For example, all reviews of a movie could be linked indirectly to each other.

The plurality of user-generated comments can be filtered, for example, as explained previously with reference to the comment-filter component 207. Accordingly, the plurality of comments can exclude low-quality comments. In another aspect, the plurality of comments can include only high-quality comments or comments with a particular characteristic of interest.

At step 1250, topics in the plurality of user-generated comments are identified. In one aspect, the topics are identified without using a corpus of pre-identified topics. The topics correspond to units of text in the plurality of user-generated comments. The topics could be identified as described previously with reference to FIG. 2.

At step 1260, a comment-summary interface showing one or more of the topics is output for display with the search results interface. The comment-summary interface may be displayed through a personal assistant application, as part of a search results page, through a browser-generated interface, or by the host of the primary content. The comment-summary interface can provide multiple topics with one or more comments under each topic. In one aspect, the user can open an interface showing all comments related to the topic by selecting the topic. The comment-summary interface can also display the sentiment of individual comments or all comments in the topic. In one aspect, a user can be provided a view of only positive or only negative comments under a particular topic. The comment-summary interface can be similar to the interfaces described previously in FIGS. 4, 5, and 8.

Figure 13:
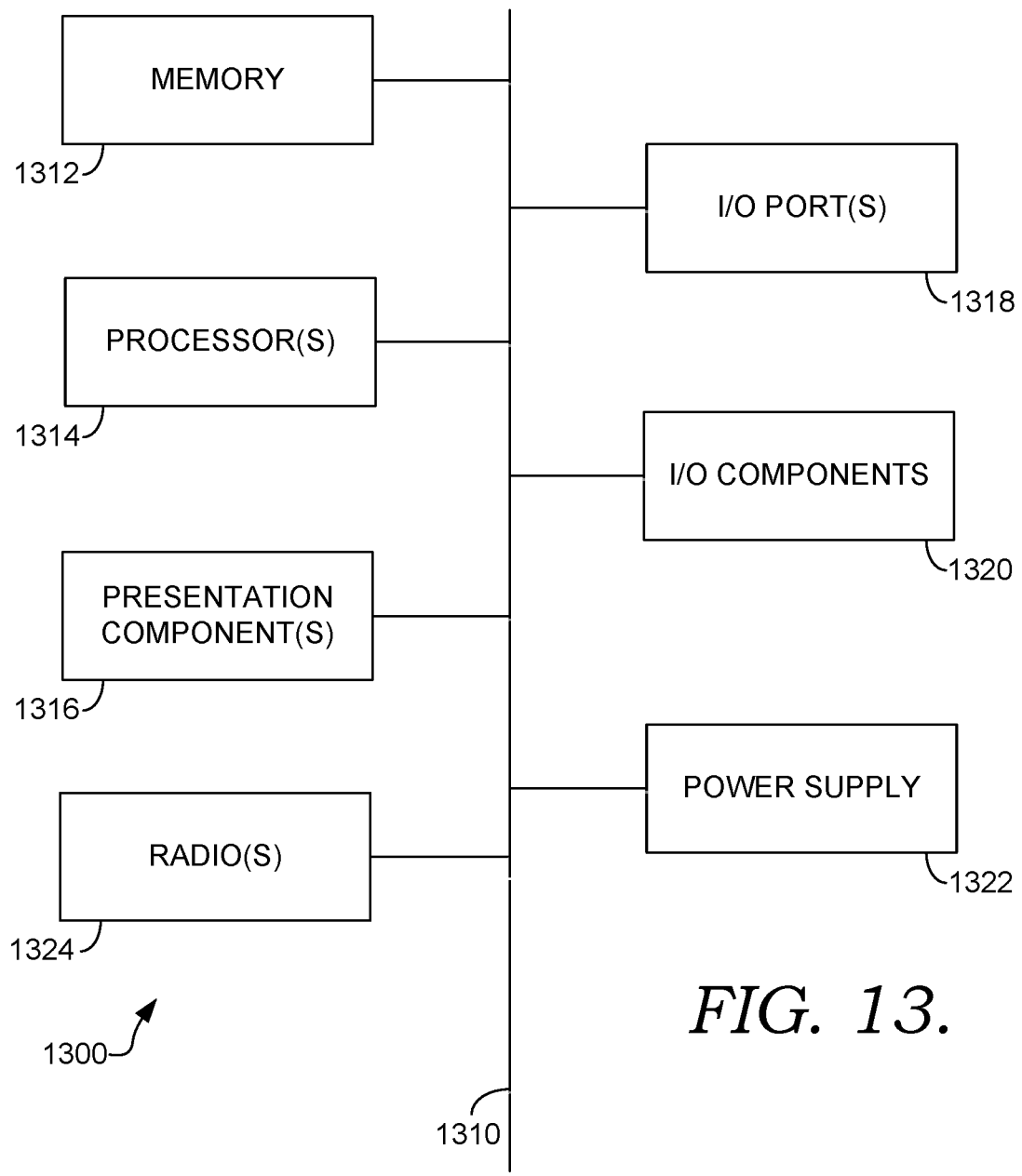
FIG. 13 is a block diagram of an exemplary computing environment suitable for implementing aspects of the technology described herein.

Referring to the drawings in general, and initially to FIG. 13 in particular, an exemplary operating environment for implementing aspects of the technology described herein is shown and designated generally as computing device 1300. Computing device 1300 is but one example of a suitable computing environment and is not intended to suggest any limitation as to the scope of use of the technology described herein. Neither should the computing device 1300 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 13, computing device 1300 includes a bus 1310 that directly or indirectly couples the following devices: memory 1312, one or more processors 1314, one or more presentation components 1316, input/output (I/O) ports 1318, I/O components 1320, and an illustrative power supply 1322. Bus 1310 represents what may be one or more busses (such as an address bus, data bus, or a combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 13 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 13 and refer to "computer" or "computing device." The computing device 1300 may be a PC, a tablet, a smartphone, virtual reality headwear, augmented reality headwear, a game console, and such.

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1312 includes computer storage media in the form of volatile and/or nonvolatile memory. The memory 1312 may be removable, non-removable, or a combination thereof. Exemplary memory includes solid-state memory, hard drives, optical-disc drives, etc. Computing device 1300 includes one or more processors 1314 that read data from various entities such as bus 1310, memory 1312, or I/O components 1320. Presentation component(s) 1316 present data indications to a user or other device. Exemplary presentation components 1316 include a display device, speaker, printing component, vibrating component, etc. I/O ports 1318 allow computing device 1300 to be logically coupled to other devices, including I/O components 1320, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1314 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1300. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1300. The computing device 1300 may be equipped with depth cameras, such as stereoscopic camera systems, infrared camera systems, RGB camera systems, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

The computing device 1300 may include a radio 1324. The radio transmits and receives radio communications. The computing device 1300 may be a wireless terminal adapted to receive communications and media over various wireless networks. Computing device 1300 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

EMBODIMENTS SECTION

Embodiment 1

A computing device comprising: at least one processor; and memory having computer-executable instructions stored thereon that, when executed by the at least one processor, configure the computing device to: receive a plurality of user-generated comments associated with a primary content; identify topics in the user-generated comments without using a predefined corpus of topics, wherein the topics correspond to units of text in the user-generated comments, and wherein the topics are selected based on a unit of text's frequency of occurrence within the plurality of user-generated comments; classify an individual user-generated comment from the plurality of user-generated comments into an individual topic from the topics; and output for display a comment-summary interface displaying the individual topic and the individual user-generated comment.

Embodiment 2

The computing device of Embodiment 1, wherein the processor is further configured to: determine a sentiment for the individual topic by performing sentiment extraction on comments classified as related to the individual topic; and output for display a sentiment summary showing a sentiment for the individual topic.

Embodiment 3

The computing device as in any one of the above embodiments, wherein the sentiment summary shows a percentage of positive comments associated with the individual topic.

Embodiment 4

The computing device as in any one of the above embodiments, wherein the plurality of user-generated comments are associated with an online publication.

Embodiment 5

The computing device as in any one of the above embodiments, wherein the units of text comprise n-grams.

Embodiment 6

The computing device as in any one of the above embodiments, wherein the plurality of user-generated comments are unstructured.

Embodiment 7

The computing device as in any one of the above embodiments, wherein the frequency of occurrence is determined using Term Frequency Inverse document frequency (TF-IDF).

Embodiment 8

The computing device as in any one of the above embodiments, wherein the individual topic is used as a heading within the comment-summary interface.

Embodiment 9

A method of categorizing unstructured comments comprising: receiving a plurality of comments having an unstructured format; breaking the plurality of comments into units of text; organizing a subset of the plurality of comments into an individual cluster based on a similarity of units of text in the subset of comments; identifying a specific unit of text that is most characteristic of the subset of comments belonging to the individual cluster; assigning the specific unit of text as a topic for the individual cluster; and outputting for display a comment-summary interface displaying at least a portion of the subset of comments from the individual cluster under a heading based on the topic.

Embodiment 10

The method of embodiment 9, further comprising: determining a sentiment for the topic by performing sentiment extraction on the comments assigned to the topic; and outputting for display a sentiment summary showing the sentiment for the topic.

Embodiment 11

The method of embodiment 10, wherein the sentiment summary shows a percentage of positive comments associated with the topic.

Embodiment 12

The method as in any one of embodiment 9, 10, or 11, wherein the comment-summary interface is generated by a personal assistant application running on a user device.

Embodiment 13

The method as in any one of embodiment 9, 10, 11, or 12, wherein the comment-summary interface is displayed as part of a search results page.

Embodiment 14

The method as in any one of embodiment 9, 10, 11, 12, or 13, wherein the plurality of comments are unstructured.

Embodiment 15

The method as in any one of embodiment 9, 10, 11, 12, 13, or 14, wherein the topic is not preselected.

Embodiment 16

One or more computer storage media having computer-executable instructions embodied thereon, that when executed, configure a computing device to perform a method of categorizing unstructured comments, the method comprising: receiving a search query; outputting a search results interface displaying a plurality of search results; receiving a user interaction with an individual search result that is associated with a primary content; receiving a plurality of user-generated comments associated with the primary content; identifying topics in the plurality of user-generated comments without using a corpus of pre-identified topics, wherein the topics correspond to units of text in the plurality of user-generated comments; and outputting for display with the search results interface a comment-summary interface showing one or more of the topics.

Embodiment 17

The media of embodiment 16, wherein the comment-summary interface comprises a display of one or more user-generated comments adjacent to one or more of the topics.

Embodiment 18

The media as in any one of embodiment 16 or 17, wherein the plurality of user-generated comments are unstructured.

Embodiment 19

The media as in any one of embodiment 16, 17, or 18, wherein the primary content is a news article posted on a webpage.

Embodiment 20

The media as in any one of embodiment 16, 17, 18, or 19, wherein the comment-summary interface comprises a display of a sentiment for user-generated comments associated with a topic.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A computing device comprising:
   at least one processor; and
   memory having computer-executable instructions stored thereon that, when executed by the at least one processor, configure a personal assistant application, executable by the computing device to:
   detect a user navigating to a website having user-generated comments and primary content;
   in response to detecting the navigation, automatically activate a personal assistant comment-summary interface;
   retrieve a plurality of user-generated comments from the website;
   identify topics in the user-generated comments without using a predefined corpus of topics, wherein the topics correspond to units of text in the user-generated comments, and wherein the topics are selected based on a unit of text's frequency of occurrence within the plurality of user-generated comments;
   classify an individual user-generated comment from the plurality of user-generated comments into an individual topic from the topics; and
   output for display within the comment-summary interface generated by the personal assistant application a comment-summary interface displaying the individual topic and the individual user-generated comment, wherein the comment-summary interface is separate from the website.

2. The computing device of claim 1, wherein the processor is further configured to:
    determine a sentiment for the individual topic by performing sentiment extraction on comments classified as related to the individual topic; and
    output for display a sentiment summary showing a sentiment for the individual topic.

3. The computing device of claim 2, wherein the sentiment summary shows a percentage of positive comments associated with the individual topic.

4. The computing device of claim 1, wherein the plurality of user-generated comments are associated with an online publication.

5. The computing device of claim 1, wherein the units of text comprise n-grams.

6. The computing device of claim 1, wherein the plurality of user-generated comments are unstructured.

7. The computing device of claim 1, wherein the frequency of occurrence is determined using Term Frequency Inverse document frequency (TF-IDF).

8. The computing device of claim 1, wherein the individual topic is used as a heading within the comment-summary interface.

9. A method of categorizing unstructured comments comprising:
    retrieving a plurality of comments from a website, the comments having an unstructured format;
    breaking the plurality of comments into units of text;
    organizing a subset of the plurality of comments into individual clusters based on a cluster analysis of the similarity of the units of text in the subset of comments, the cluster analysis taking into account a plurality of factors comprising a relationship between the comments, meaning and relationship of terms, user information, and definition of terms;
    subsequent to the cluster analysis, identifying a specific unit of text that is most characteristic of the subset of comments belonging to the individual cluster;
    assigning the specific unit of text as a topic for the individual cluster; and
    outputting for display a comment-summary interface displaying at least a portion of the subset of comments from the individual cluster under a heading based on the topic, wherein the comment-summary interface is separate from the website.

10. The method of claim 9, further comprising:
    determining a sentiment for the topic by performing sentiment extraction on the comments assigned to the topic; and
    outputting for display a sentiment summary showing the sentiment for the topic.

11. The method of claim 10, wherein the sentiment summary shows a percentage of positive comments associated with the topic.

12. The method of claim 9, wherein the comment-summary interface is generated by a personal assistant application running on a user device and working in tandem with a web browser displaying the website.

13. The method of claim 9, wherein the comment-summary interface is displayed as part of a search results page.

14. The method of claim 9, wherein the plurality of comments are unstructured.

15. The method of claim 9, wherein the topic is not preselected.

16. One or more computer storage media having computer-executable instructions embodied thereon, that when executed, configure a computing device to perform a method of categorizing unstructured comments through the use of a personal assistant application, the method comprising:
    receiving a search query through the personal assistant application;
    outputting a search results interface within the personal assistant application displaying a plurality of search results;
    receiving a user interaction with an individual search result that is associated with a primary content, through the personal assistant application;
    detecting that the individual search result is for a website having primary content and being associated with user-generated comments;
    in response to detecting that the individual search result is for a website having primary content and being associated with user-generated comments, automatically activating a personal assistant comment-summary interface;
    retrieving a plurality of user-generated comments associated with the primary content from the website;
    identifying topics in the plurality of user-generated comments without using a corpus of pre-identified topics, wherein the topics correspond to units of text in the plurality of user-generated comments; and
    outputting, by the personal assistant application, for display with the search results interface the comment-summary interface showing one or more of the topics, wherein the comment-summary interface is separate from the website.

17. The media of claim 16, wherein the comment-summary interface comprises a display of one or more user-generated comments adjacent to one or more of the topics.

18. The media of claim 16, wherein the plurality of user-generated comments are unstructured.

19. The media of claim 16, wherein the primary content is a news article posted on the website.

20. The media of claim 16, wherein the comment-summary interface comprises a display of a sentiment for user-generated comments associated with a topic.

* * * * *